(12) United States Patent
Matsunaga et al.

(10) Patent No.: US 11,340,119 B2
(45) Date of Patent: May 24, 2022

(54) SENSOR BODY AND METHOD OF MANUFACTURING SENSOR BODY

(71) Applicant: Yazaki Corporation, Tokyo (JP)

(72) Inventors: Kazuyuki Matsunaga, Shizuoka (JP); Keisuke Yamauchi, Shizuoka (JP); Toshirou Mochizuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 427 days.

(21) Appl. No.: 16/441,232

(22) Filed: Jun. 14, 2019

(65) Prior Publication Data
US 2019/0383668 A1    Dec. 19, 2019

(30) Foreign Application Priority Data

Jun. 18, 2018    (JP) .............................. JP2018-115175

(51) Int. Cl.
| | | |
|---|---|---|
| *G01K 1/08* | (2021.01) | |
| *G01K 7/22* | (2006.01) | |
| *H01C 1/01* | (2006.01) | |
| *H01C 7/00* | (2006.01) | |
| *H01C 17/00* | (2006.01) | |

(52) U.S. Cl.
CPC ................. *G01K 1/08* (2013.01); *G01K 7/22* (2013.01); *H01C 1/01* (2013.01); *H01C 7/008* (2013.01); *H01C 17/00* (2013.01)

(58) Field of Classification Search
None
See application file for complete search history.

(56) References Cited

U.S. PATENT DOCUMENTS

2016/0305825 A1    10/2016  Chokri
2017/0122814 A1*   5/2017   Motooka .................. G01K 1/14

FOREIGN PATENT DOCUMENTS

| JP | 6-16835 U    | 3/1994 |
| JP | 8-54292 A    | 2/1996 |
| JP | 8-327464 A   | 12/1996 |
| JP | 2004-128274 A | 4/2004 |
| JP | 2017-058183 A | 3/2017 |

* cited by examiner

*Primary Examiner* — Erica S Lin
(74) *Attorney, Agent, or Firm* — Sughrue Mion, PLLC

(57) ABSTRACT

A method of manufacturing a sensor body used in an oil temperature sensor includes mounting a thermistor on a scheduled first resin mold portion and a scheduled second resin mold portion. The manufacturing method includes molding the scheduled first resin mold portion, the scheduled second resin mold portion, and the thermistor to form a resin mold portion. The manufacturing method includes cutting connecting portions, after the resin mold portion is formed, and separating a scheduled first-terminal-portion forming portion and a scheduled second-terminal-portion forming portion.

5 Claims, 16 Drawing Sheets

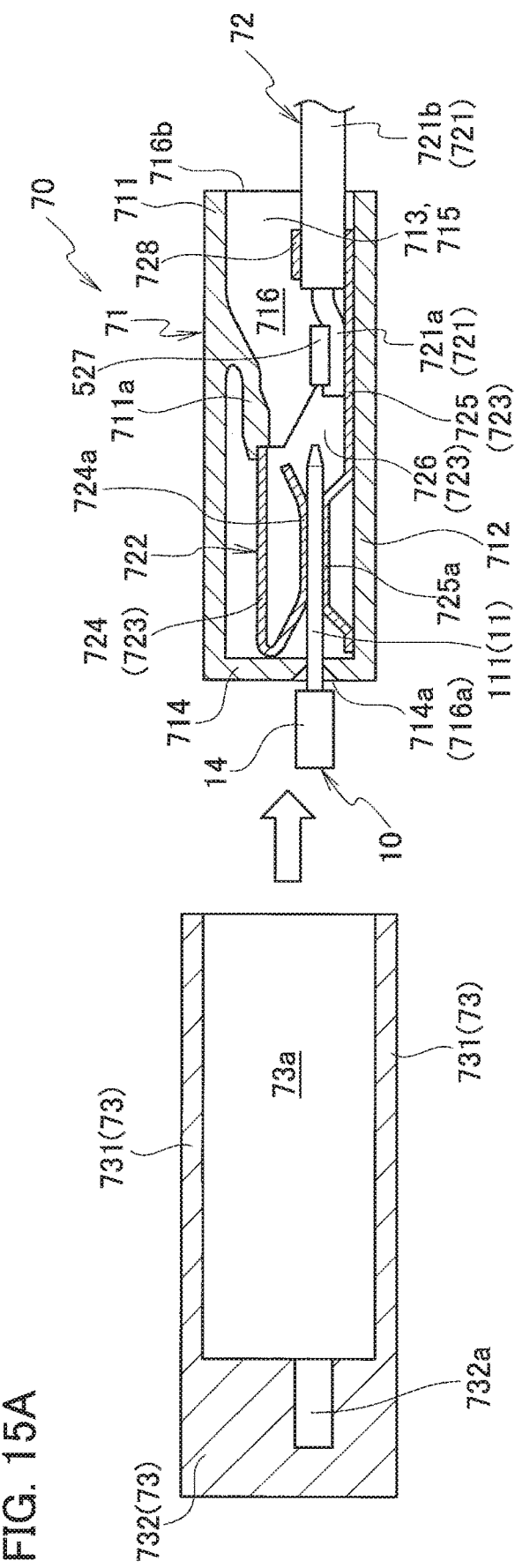
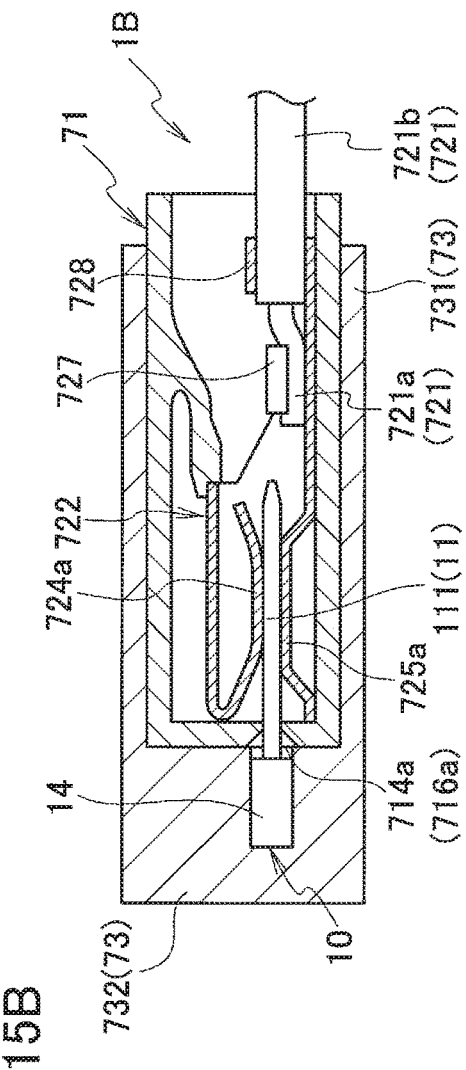
FIG. 15A
FIG. 15B

SENSOR BODY AND METHOD OF MANUFACTURING SENSOR BODY

CROSS REFERENCE TO RELATED APPLICATION

This application is based upon and claims the benefit of priority from the prior Japanese Patent Application No. 2018-115175, filed on Jun. 18, 2018, the entire contents of which are incorporated herein by reference.

BACKGROUND

1. Technical Field

The present invention relates to a sensor body used in an oil temperature sensor that detects the temperature of oil, and a method of manufacturing the sensor body.

2. Related Art

An oil temperature sensor using a thermistor that outputs a signal corresponding to the temperature of oil has been known. This kind of oil temperature sensor has been proposed in Patent Literature 1 (Japanese Patent Application Laid-Open Publication No. 2017-058183). In Patent Literature 1, an internal device sub-assembly includes a thermistor element, in which its tip end of a lead is connected to a cable, is held in a sensor body. With the internal device sub-assembly held in the sensor body, the sensor body is inserted into a housing in which the mold material is injected and covered with the mood resin to form the oil temperature sensor.

SUMMARY

In the related art, however, the thermistor is exposed to the outside even when the inner device sub-assembly is held in the sensor body. The element portion of the thermistor is typically made of glass. Therefore, the element portion of the thermistor may be damaged before being inserted into the housing by contacting equipment or the like, or the electrical connection between the lead wire and the cable may be disconnected. If the thermistor is broken or disconnected from the cable, the sensor may deteriorate its temperature detection accuracy.

It is an object of the present invention to provide a sensor body capable of preventing deterioration of temperature detection accuracy, and a method of manufacturing such a sensor body.

According to an embodiment, there is provided a method of manufacturing a sensor body used in an oil temperature sensor that detects a temperature of oil, including: preparing a material for preparing a lead frame material in which a scheduled first-terminal-portion forming portion of a first lead frame portion and a scheduled second-terminal-portion forming portion of a second lead frame portion are connected by a connecting portion; mounting a thermistor for mounting one end of a thermistor on a scheduled first resin mold portion of the first lead frame portion, while mounting the other end of the thermistor on a scheduled second resin mold portion of the second lead frame portion; when the thermistor is mounted on the scheduled first resin mold portion and the scheduled second resin mold portion, molding the scheduled first resin mold portion, the scheduled second resin mold portion, and the thermistor to form a resin mold portion; and cutting the connecting portion after the resin mold portion is formed, and separating the scheduled first-terminal-portion forming portion and the scheduled second-terminal-portion forming portion.

The molding may include forming the resin mold portion by transfer molding.

The connecting portion may include a first connecting portion connecting the scheduled first-terminal-portion forming portion and the scheduled second-terminal-portion forming portion and a second connecting portion connecting the scheduled first-terminal-portion forming portion and the scheduled second-terminal-portion forming portion at a location different from the location of the first connecting portion, the cutting may include cutting the first connecting portion and the second connecting portion.

A first recess opening toward the scheduled second resin mold portion may be formed in the scheduled first resin mold portion, a second recess opening toward the scheduled first resin mold portion may be formed at a location of the scheduled second resin mold portion facing the first recess, and the mounting the thermistor may include mounting the thermistor in a manner that one end of the thermistor is placed in the first recess and the other end of the thermistor is placed in the second recess.

The first recess may be formed stepwise and become deeper toward the second recess, and the second recess may be formed stepwise and become deeper toward the first recess.

According to an embodiment, there is provided a sensor body used in an oil temperature sensor that detects a temperature of oil, including: a thermistor; a resin mold portion in which the thermistor is buried; a first lead frame including a first buried portion on which one end of the thermistor is mounted and which is buried in the resin mold portion, and a first terminal portion provided continuously from the first buried portion and exposed from the resin mold portion; and a second lead frame including a second buried portion on which the other end of the thermistor is mounted and buried in the resin mold portion, and a second terminal portion provided continuously from the second buried portion and exposed from the resin mold portion, the second lead frame being arranged apart from the first lead frame, wherein the first terminal portion and the second terminal portion each include a cut mark formed when the connected portion is cut, and the first terminal portion and the second terminal portion include a tip-side cut mark formed on the tip-side and a base-side cut mark formed on the base side.

According to the embodiments, it is possible to provide a sensor body capable of preventing the decrease in temperature detection accuracy and a method of manufacturing the sensor body.

BRIEF DESCRIPTION OF DRAWINGS

FIG. 15A is a cross-sectional view schematically illustrating the oil temperature sensor according to the fourth embodiment before the connector unit and the cover are fitted each other;

FIG. 15B is a cross-sectional view schematically illustrating the oil temperature sensor according to the fourth embodiment after the connector unit and the cover over are fitted each other;

DETAILED DESCRIPTION

Figure 1:
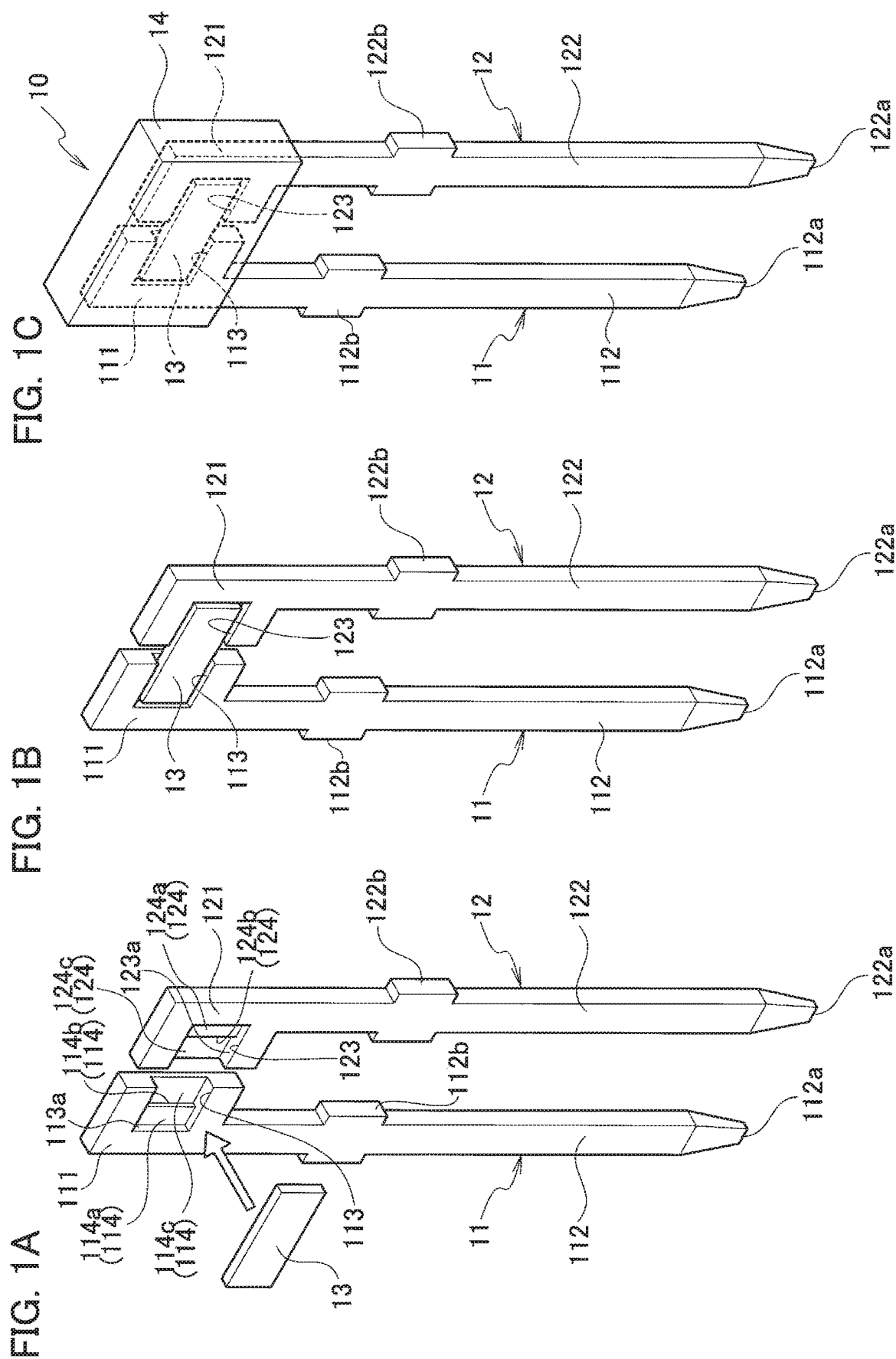
FIG. 1A is a perspective view schematically illustrating an example structure of a sensor body according to a first embodiment before a thermistor is mounted on a lead frame.
FIG. 1B is a perspective view schematically illustrating an example structure of the sensor body according to the first embodiment when the thermistor is mounted on the lead frame.
FIG. 1C is a perspective view schematically illustrating an example structure of the sensor body according to the first embodiment in which the sensor body is illustrated.

Embodiments of the present invention will be described in detail below with reference to the accompanying drawings. In the following, an oil temperature sensor which detects the temperature of oil used in a motor vehicle, such as an automatic transmission fluid (ATF) flowing through an automatic transmission, is described as an example. To detect the temperature of the ATF, the temperature of the ATF detected by the oil temperature sensor is output to an electronic control unit (ECU). The detected temperature of the ATF is used for transmission control of the ECU. Specifically, the ECU controls shock reduction of gearshift, optimal gear selection corresponding to traveling conditions, fuel efficiency improvement, and so on in accordance with the detected temperature of the ATF.

Similar components are included in a plurality of embodiments described below. The same reference numerals are given to such similar components and their description are not repeated.

First Embodiment

A sensor body 10 according to the present embodiment detects the temperature of oil.

As illustrated in FIGS. 1A to 1C, the sensor body 10 includes a first lead frame 11 and a second lead frame 12 which is arranged apart from the first lead frame 11. The first lead frame 11 and the second lead frame 12 are conductive, and may be formed using, for example, a metal plate.

The first lead frame 11 and the second lead frame 12 are electrically connected via a thermistor 13 that outputs a signal corresponding to the temperature of the oil. Specifically, one end of the thermistor 13 is mounted on the first lead frame 11, while the other end of the thermistor 13 is mounted on the second lead frame 12, thus electrically connecting the first lead frame 11 and the second lead frame 12 via the thermistor 13.

The sensor body 10 also includes a resin mold portion 14. The resin mold portion 14 covers the thermistor 13 and the portion where the first lead frame 11 and the second lead frame 12 are mounted on the thermistor 13 (see FIG. 1C). In the present embodiment, a first recess 113 described later is a mounting portion of the first lead frame 11 on the thermistor 13, and a second recess 123 is a mounting portion of the second lead frame 12 on the thermistor 13.

In the present embodiment, the thermistor 13 is entirely covered with the resin mold portion 14, as illustrated in FIG. 1C. On the other hand, the first lead frame 11 and the second lead frame 12 are covered with the resin mold portion 14 only partially (near the portion where the thermistor 13 is mounted).

Thus, in the present embodiment, the first lead frame 11 includes a first buried portion 111 on which one end of the thermistor 13 is mounted and which is buried in the resin mold portion 14. Further, the first lead frame 11 includes a first terminal portion 112 which is provided continuously from the first buried portion 111 and exposed from the resin mold portion 14. The first lead frame 11 is formed in an elongated shape.

Similarly, the second lead frame 12 includes a second buried portion 121 on which the other end of the thermistor 13 is mounted and which is buried in the resin mold portion 14. Further, the second lead frame 12 includes a second terminal portion 122 which is provided continuously from the second buried portion 121 and exposed from the resin mold portion 14. The second lead frame 12 is formed in an elongated shape.

In the present embodiment, the first lead frame 11 and the second lead frame 12 are formed to be substantially symmetrical in plan view.

The first lead frame 11 and the second lead frame 12 are arranged substantially in parallel so that the first lead frame 11 and the second lead frame 12 are arranged longitudinally in the same direction. The first lead frame 11 and the second lead frame 12 are arranged widthwise in a manner that the first buried portion 111 and the second buried portion 121 face each other, and that the first terminal portion 112 and the second terminal portion 122 face each other.

The first lead frame 11 and the second lead frame 12 are formed such that their end portions being wider on the side of the buried portions than their end portions on the side of the terminal portions. Specifically, in the plan view, the end portions of the first lead frame 11 and the second lead frame 12 on the side of the buried portions are shaped to protrude toward the end portions of the opponent buried portions. In other words, a facing distance between the first lead frame 11 and the second lead frame 12 is shorter at the end portions on the side of the buried portions than at the end portions on the side of the terminal portions.

The thermistor 13 is mounted on the end portions on the side of the buried portions where the facing distance is short. As described above, by decreasing the facing distance only at the portion where the thermistor 13 is mounted, while ensuring the insulation distance between the terminal portions, mounting of the thermistor 13 is facilitated. Preferably, the facing distance at the portion where the thermistor 13 is mounted is set so as to prevent short-circuiting between the two lead frames due to melted solder during mounting, while preventing insufficient mounting due to outflow of the solder.

Further, a recess is formed in both the first and second buried portions 111 and 121, and the thermistor 13 is placed in the recess in the present embodiment.

Specifically, the first buried portion 111 includes a first recess 113 which is opened toward the second buried portion 121 and in which one end of the thermistor 13 is mounted. The second buried portion 121 includes a second recess 123 located at a portion facing the first recess 113. The second recess 123 is opened toward the first buried portion 111 and in which the other end of the thermistor 13 is mounted.

By mounting the thermistor 13 in the recess configured as described above, the solder flow can be stopped by inner surfaces 113a and 123a of each recess when the thermistor 13 is soldered. The inner surfaces 113a and 123a also prevent positional displacement of the thermistor 13.

In the present embodiment, the first recess 113 is formed stepwise so that its depth becomes deeper toward the second recess 123. The second recess 123 is formed stepwise so that its depth becomes deeper toward the first recess 113.

Figure 2:
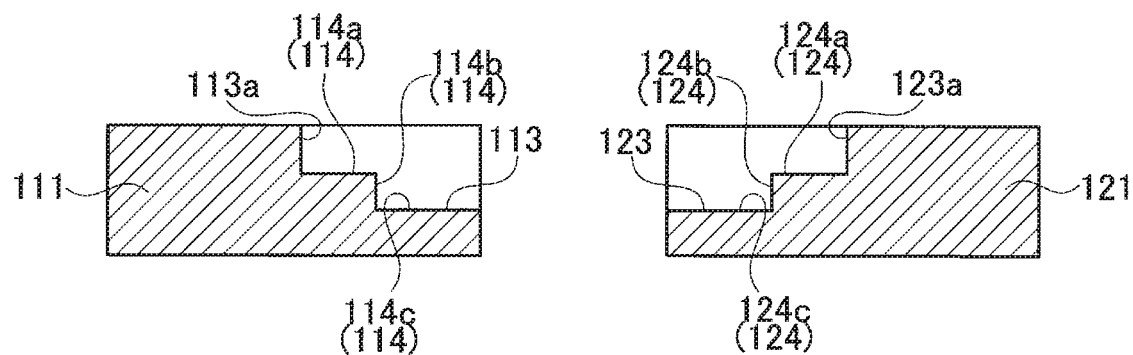
FIG. 2 is a cross-sectional view schematically illustrating a recess formed in the lead frame according to the first embodiment.

Specifically, as illustrated in FIG. 2, the first recess 113 includes a near-side mounting surface 114a located away from the second recess 123 and near the opening of the first recess 113 (open side in the plate thickness direction), and having a shallow depth from the opening. The near-side mounting surface 114a is formed to extend longitudinally and widthwise. The first recess 113 also includes a far-side mounting surface 114c located closer to the second recess 123 and on the far side of the first recess 113, and having a deep depth. The far-side mounting surface 114c is formed to extend longitudinally and widthwise. Further, the first recess 113 includes a stepped surface 114b connecting the near-side mounting surface 114a and the far-side mounting surface 114c. The stepped surface 114b is formed to extend in the plate thickness direction of the first lead frame 11. Thus, the first recess 113 includes a stepped portion 114 formed by the near-side mounting surface 114a, the far-side mounting surface 114c, and the stepped surface 114b.

Similarly, the second recess 123 includes a near-side mounting surface 124a located away from the first recess 113 and near the opening of the second recess 123 (open side in the plate thickness direction), and having a shallow depth from the opening. The near-side mounting surface 124a is formed to extend longitudinally and widthwise. The second recess 123 also includes a far-side mounting surface 124c located closer to the first recess 113 and on the far side of the second recess 123, and having a deep depth. The far-side mounting surface 124c is formed to extend longitudinally and widthwise. A stepped surface 124b connecting the near-side mounting surface 124a and the far-side mounting surface 124c is formed in the second recess 123 so as to extend in the thickness direction of the second lead frame 12. Thus, the second recess 123 includes a stepped portion 124 formed by the near-side mounting surface 124a, the far-side mounting surface 124c, and the stepped surface 124b.

Figure 3A:
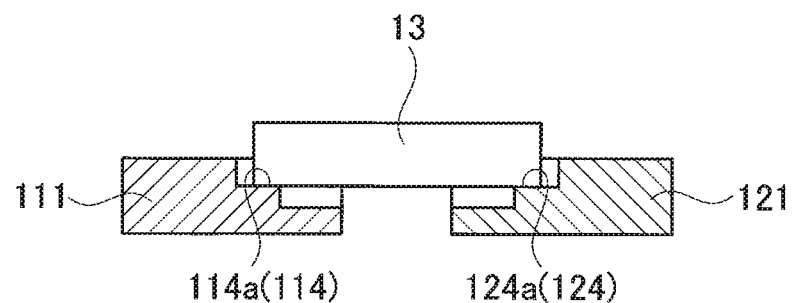
FIG. 3A is a cross-sectional view schematically illustrating a relatively large thermistor mounted in the recess formed in the lead frame according to the first embodiment.
Figure 3B:
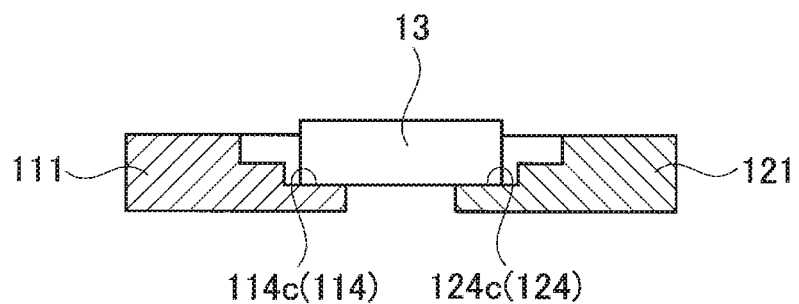
FIG. 3B is a cross-sectional view schematically illustrating a relatively small thermistor mounted in the recess formed in the lead frame according to the first embodiment.

As described above, in the present embodiment, each lead frame has the two-stepped recess. With this structure, a relatively large thermistor 13 can be mounted on the upper wider stage of the recess, and a relatively small thermistor can be mounted on the lower narrower stage (see FIGS. 3A and 3B). In other words, by forming the step in the recess, the mounting location of the thermistor 13 can be appropriately selected in accordance with the size of the thermistor 13.

The first lead frame 11 and the second lead frame 12 are formed such that the depth from the opening of the near-side mounting surface 114a and the depth from the opening of the near-side mounting surface 124a are substantially the same. Further, the first lead frame 11 and the second lead frame 12 are formed such that the depth from the opening of the far-side mounting surface 114c and the depth from the opening of the far-side mounting surface 124c are substantially the same. The first lead frame 11 and the second lead frame 12 have the near-side mounting surface 114a and the near-side mounting surface 124a on the same plane, and the far-side mounting surface 114c and the far-side mounting surface 124c on the same plane.

As described above, in the present embodiment, the first lead frame 11 and the second lead frame 12 have a mirror-symmetrical shape with respect to the plane extending in the longitudinal direction and the thickness direction.

As the thermistor 13 mounted on the pair of lead frames 11 and 12, a negative temperature coefficient (NTC) thermistor, for example, whose resistance decreases with the increase of the temperature can be used. A positive temperature coefficient (PTC) thermistor whose resistance increases with the increase of the temperature can also be used. It is also possible to use a critical temperature resistor (CTR) thermistor whose resistance decreases sharply above a certain temperature.

Further, in the present embodiment, a surface mount type (chip-like thermistor) is used as the thermistor 13.

A conventionally known thermistor can be used as the thermistor 13.

Then, the surface mount type thermistor 13 is mounted on the first lead frame 11 and the second lead frame 12 by soldering. In this way, by mounting the surface mount type thermistor 13 using solder, there is no need to access from the rear side when connecting the thermistor 13 to the lead frame, and the thermistor 13 can be connected to the lead frame more easily.

Further, as described above, in the present embodiment, the thermistor 13 and the portion where the thermistor is mounted on the first and second lead frames 11 and 12 are entirely covered with the resin mold portion 14. The first and second lead frames 11 and 12 are each formed such that the entire portion formed to protrude toward the opponent buried portion is covered with the resin mold portion 14 on one end side in the longitudinal direction, while the other end in the longitudinal direction is exposed from the resin mold portion 14. In other words, the sensor body 10 is formed in a manner that only the first terminal portion 112 and the second terminal portion 122, each having a function as a terminal, protrude outward. As described above, the thermistor 13 is protected by covering the thermistor 13 with the resin mold portion 14.

Figure 4:
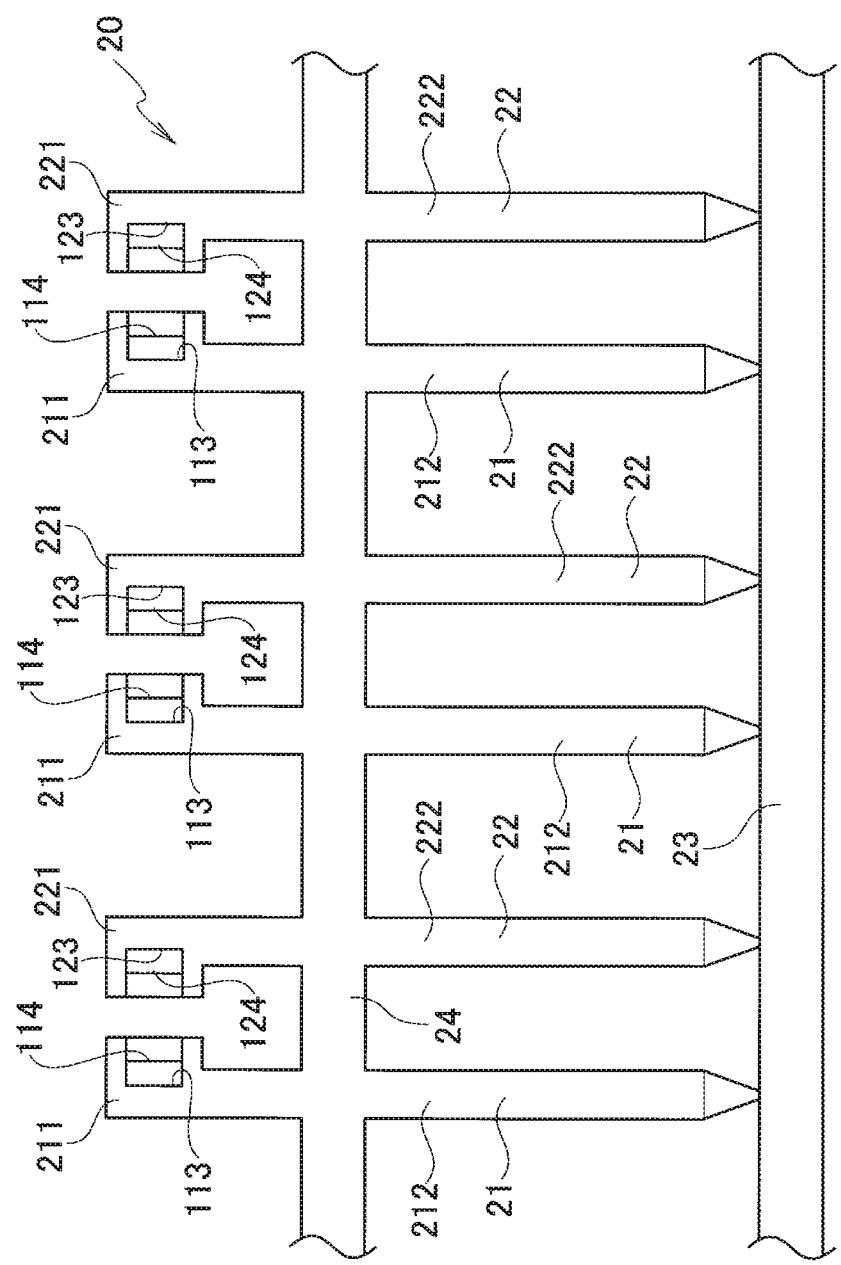
FIG. 4 is a plan view schematically illustrating a lead frame material according to the first embodiment.

The sensor body 10 can be manufactured, for example, using a lead frame material 20 illustrated in FIG. 4.

Hereinafter, an example method of manufacturing the sensor body 10 will be described with reference to FIGS. 4 to 9.

The lead frame material 20 connects a scheduled first-terminal-portion forming portion 212 where a first terminal portion 112 is to be formed and a scheduled second-terminal-portion forming portion 222 where a second terminal portion 122 is to be formed via connecting portions 23 and 24 when the sensor body 10 is manufactured. The lead frame material 20 can be made of a metal plate by press-forming. The present embodiment illustrates the lead frame material 20 in which a plurality of frame portions each forming a pair (first lead frame portions 21 and second lead frame portions 22) are arranged in parallel. The method of arranging the pairs of lead frame portions is not limited to the method illustrated in FIG. 4.

In the method of manufacturing the sensor body 10 described below, it is necessary to first prepare the lead frame material 20 by, for example, manufacturing the lead frame material 20.

In other words, the method of manufacturing the sensor body 10 includes a material preparation step of preparing the lead frame material 20. In the material preparation step, the lead frame material 20 is prepared. The lead frame material 20 includes the scheduled first-terminal-portion forming portion 212 of the first lead frame portion 21 and the scheduled second-terminal-portion forming portion 222 of the second lead frame portion 22, and these scheduled first- and second-terminal-portion forming portions 212 and 222 are connected by the connecting portions 23 and 24 (see FIG. 5A).

Figure 5A:
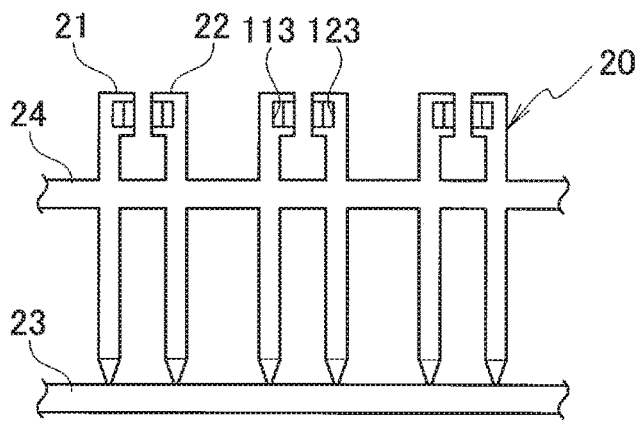
FIG. 5A is a plan view schematically illustrating an example method of manufacturing a sensor body according to the first embodiment in which a lead frame material is illustrated.
Figure 5B:
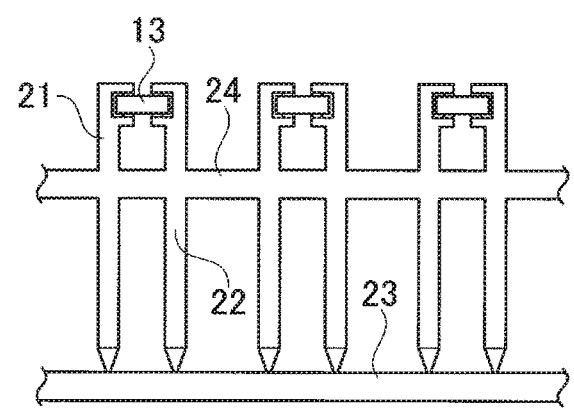
FIG. 5B is a plan view schematically illustrating the example method of manufacturing the sensor body according to the first embodiment in which a thermistor is mounted on the lead frame material.

After preparing the lead frame material 20, the thermistors 13 are mounted on predetermined portions of the lead frame material 20 (see FIG. 5B). In the present embodiment, each thermistor 13 is mounted on scheduled resin mold portions (scheduled first and second resin mold portions 211 and 221) of the lead frame portions (the first and second lead frame portions 21 and 22). Specifically, the recesses (the first recess 113 and the second recess 123) are formed in the scheduled resin mold portions (the scheduled first and second resin mold portions 211 and 221). The thermistor 13 is mounted on the lead frame portions (the first lead frame portion 21 and the second lead frame portion 22) as being mounted in the recesses (the first recess 113 and the second recess 123).

Thus, the method of manufacturing the sensor body 10 includes a thermistor mounting step. In the thermistor mounting step, one end of the thermistor 13 is mounted on the scheduled first resin mold portion 211 of the first lead frame portion 21, while the other end of the thermistor 13 is mounted on the scheduled second resin mold portion 221 of the second lead frame portion 22.

Figure 5C:
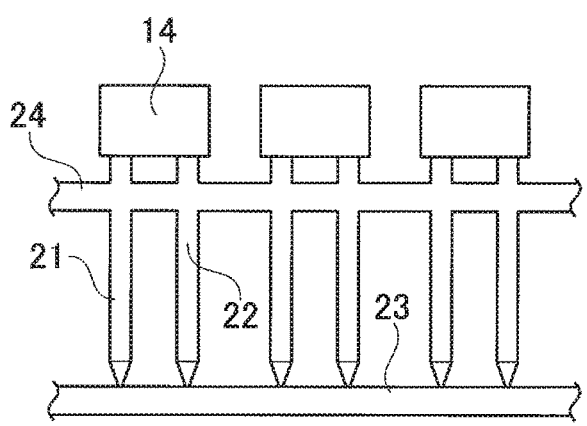
FIG. 5C is a plan view schematically illustrating the example method of manufacturing the sensor body according to the first embodiment when a resin mold portion is formed.
Figure 5D:
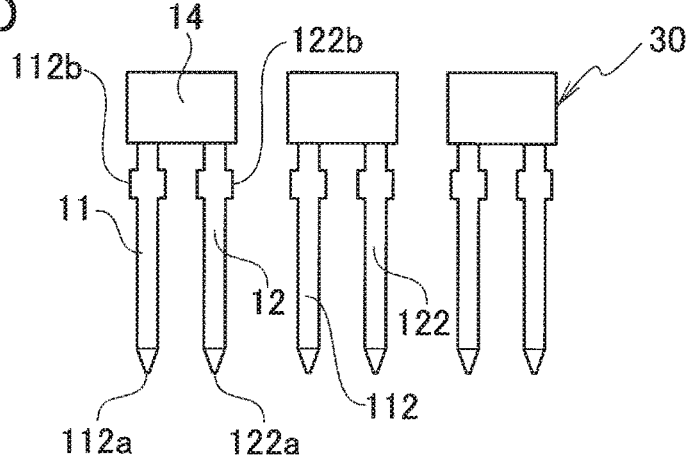
FIG. 5D is a plan view schematically illustrating the example method of manufacturing the sensor body according to the first embodiment when the sensor body is formed.

With the thermistor 13 mounted on the first lead frame portion 21 and the second lead frame portion 22, the scheduled first resin mold portion 211, the scheduled second resin mold portion 221, and the thermistor 13 are subjected to molding (see FIG. 5C).

Thus, the method of manufacturing the sensor body 10 includes a molding step. In the molding step, the scheduled first resin mold portion 211, the scheduled second resin mold portion 221, and the thermistor 13 are molded with resin, with the thermistor 13 mounted on the scheduled first resin mold portion 211 and the scheduled second resin mold portion 221.

Accordingly, the resin mold portion 14 that covers the scheduled first resin mold portion 211, the scheduled second resin mold portion 221, and the thermistor 13 is formed.

In the present embodiment, the resin mold portion 14 is made of epoxy resin by transfer molding. By molding the thermistor 13 with the epoxy resin by transfer molding, it is possible to prevent application of excessive molding pressure to the thermistor 13 when the resin mold portion 14 is formed.

The present embodiment can further prevent application of the excessive molding pressure to the thermistor 13 when the resin mold portion 14 is formed.

Figure 7A:
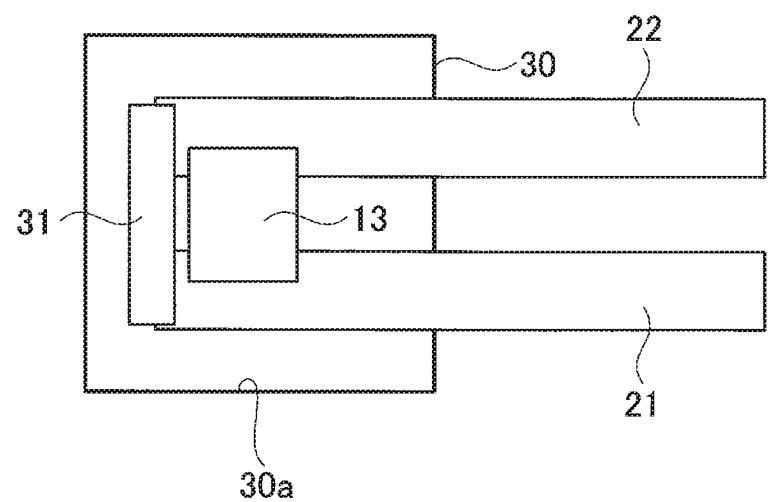
FIG. 7A is a plan view schematically illustrating an example method of forming the resin mold portion according to the first embodiment when a movable protective wall is arranged in a cavity of a mold.
Figure 7B:
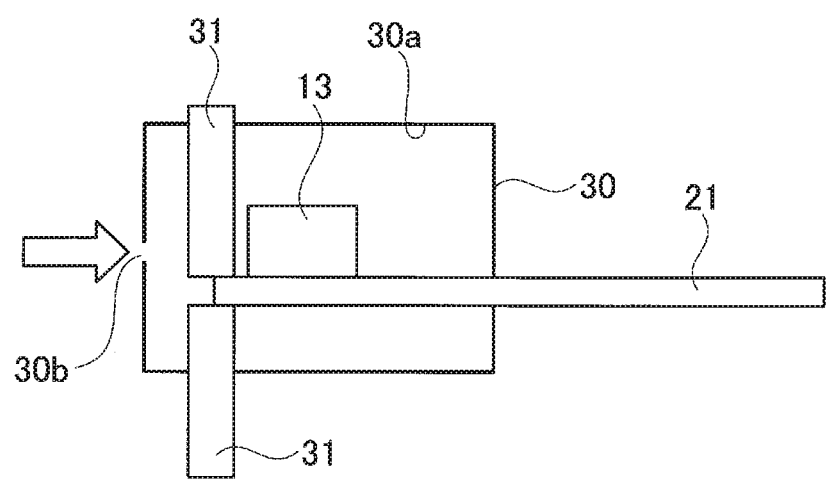
FIG. 7B is a side view schematically illustrating the example method of forming the resin mold portion according to the first embodiment when the movable protective wall is arranged in a cavity of a mold.
Figure 8:
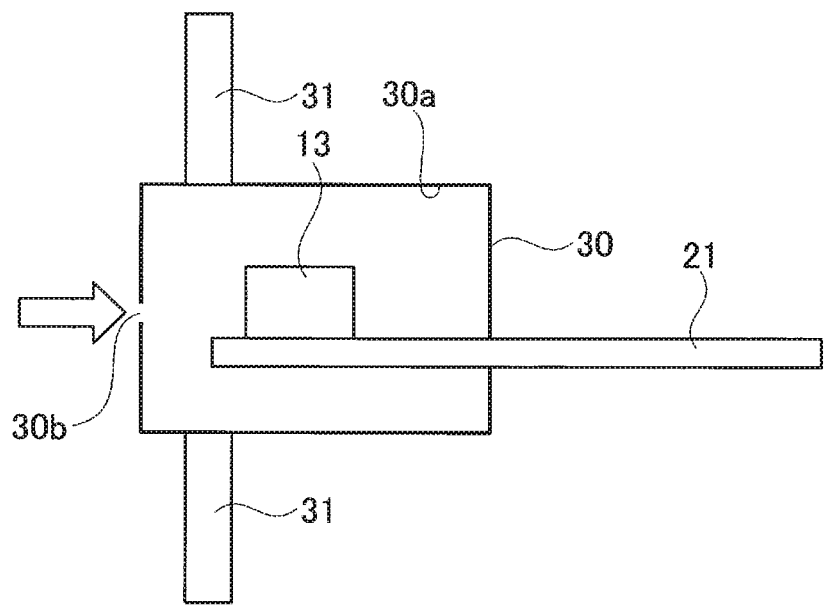
FIG. 8 is a side view schematically illustrating the example method of forming the resin mold portion according to the first embodiment when the movable protective wall is moved to the outside of the cavity of the mold.

Specifically, as illustrated in FIGS. 7A, 7B, and 8, the scheduled first resin mold portion 211 and the scheduled second resin mold portion 221 are arranged, with the thermistor 13 mounted on the scheduled first and second resin mold portions 211 and 221, in a cavity 30a of a mold 30. In an initial state, a protective wall 31 is interposed between an injection port 30b and the thermistor 13 when resin (epoxy resin) is injected into the cavity 30a from the injection port 30b. With this structure, the resin injected from the injection port 30b does not directly contact the thermistor 13. The protective wall 31 is slidably attached to the mold 30. When a certain amount of resin is injected into the cavity 30a, the protective member 31 is slid and taken out to fill the cavity 30a with the resin. With this structure, the molding pressure applied to the thermistor 13 in formation of the resin mold portion 14 can be decreased.

Figure 9:
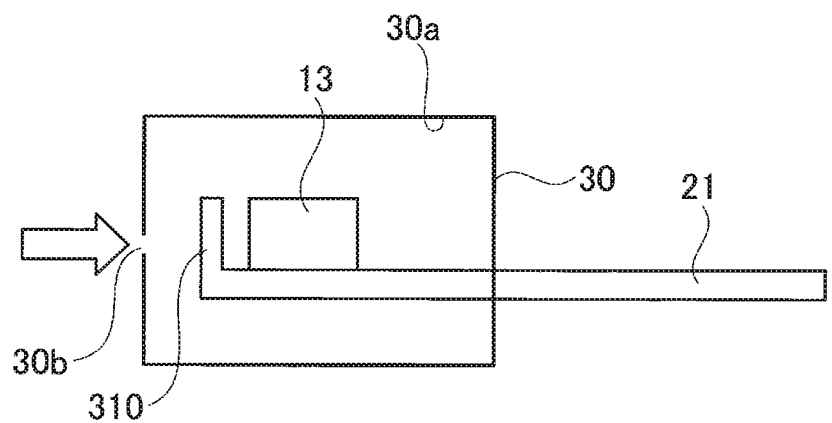
FIG. 9 is a side view schematically illustrating another example method of forming the resin mold portion according to the first embodiment.

As illustrated in FIG. 9, a protective wall 310 may be provided on the lead frame portion (the first lead frame portion 21 or the second lead frame portion 22). With this structure, the molding pressure applied to the thermistor 13 during formation of the resin mold portion 14 can be also decreased. The first lead frame portion 21 and the second lead frame portion 22 need to be insulated from each other. If, therefore, the protective wall 310 is provided in one lead frame portion, it is necessary to interpose the protective wall 310 between the injection port 30b and the thermistor 13 without contacting the other lead frame portion on which no protective wall 310 is provided. By mounting the thermistor 13 on the first lead frame portion and the second lead frame portion 22, the first lead frame portion 21 and the second lead frame portion 22 are electrically connected via the thermistor 13.

After the resin mold portion 14 is formed, the connecting portions 23 and 24 are cut, the connecting portions 23 and 24 connecting the scheduled first-terminal-portion forming portion 212 of the first lead frame portion 21 and the scheduled second-terminal-portion forming portion 222 of the second lead frame portion 22.

Thus, the method of manufacturing the sensor body 10 includes a cutting step. In the cutting step, the connecting portions 23 and 24 are cut after the resin mold portion 14 is formed and the scheduled first-terminal-portion forming portion 212 and the scheduled second-terminal-portion forming portion 222 are separated. The sensor body 10 is formed by separating the scheduled first-terminal-portion forming portion 212 and the scheduled second-terminal-portion forming portion 222.

At this time, cut marks which are left on the first terminal portion 112 and the second terminal portion 122 which are made when the connected portions are cut.

In the present embodiment, the connecting portions include the first connecting portion 23 that connects the tip ends of the scheduled first-terminal-portion forming portion 212 and the scheduled second-terminal-portion forming portion 222. The connecting portions also include the second connecting portion 24 that connects the scheduled first-terminal-portion forming portion 212 and the scheduled second-terminal-portion forming portion 222 at a location (the base side of each scheduled terminal forming portion) different from that of the first connecting portion 23.

Therefore, in the cutting step, both the first connecting portion 23 and the second connecting portion 24 are cut.

As described above, when the lead frame material 20 connected by the two connecting portions 23 and 24 is used, the tip-side cut marks 112a and 122a and the base-side cut marks 112b and 122b are formed on the first terminal portion 112 and the second terminal portion 122 (see FIGS. 1A to 1C). These cut marks are formed by cutting the connecting portions. For this reason, for example, the surface is rougher than other portions or protrudes in the width direction. In the present embodiment, the tip-side cut marks 112a and 122a have rougher surfaces than the surfaces of other portions, and the base-side cut marks 112b protrude in the width direction. The cut marks are polished marks if the rough surfaces are polished.

Figure 6A:
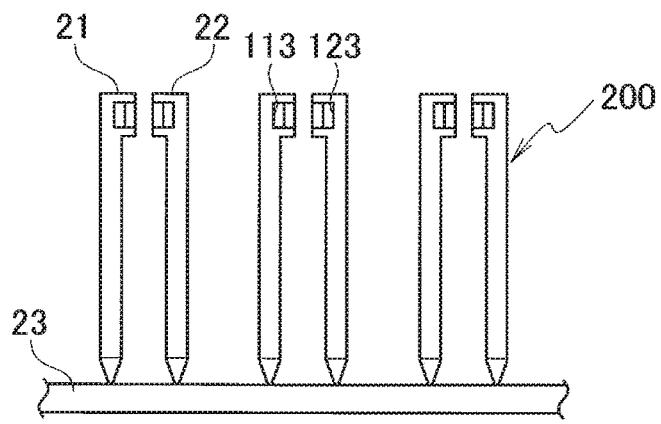
FIG. 6A is a plan view schematically illustrating an example method of manufacturing a sensor body according to a comparison example in which a lead frame material is illustrated.
Figure 6B:
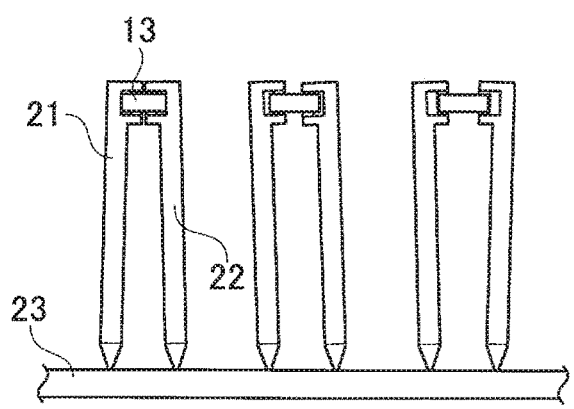
FIG. 6B is a plan view schematically illustrating the example method of manufacturing the sensor body according to the comparison example in which a thermistor is mounted on the lead frame material.
Figure 6C:
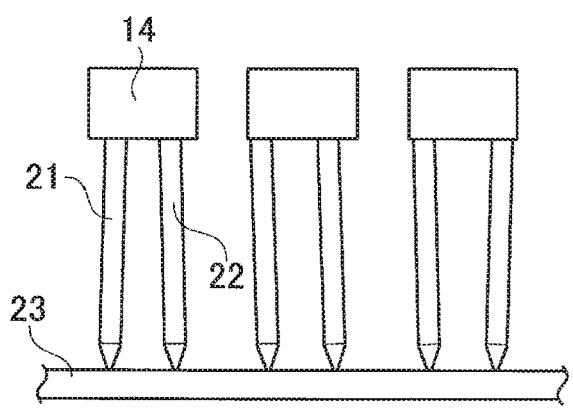
FIG. 6C is a plan view schematically illustrating the example method of manufacturing the sensor body according to the comparison example when a resin mold portion is formed.
Figure 6D:
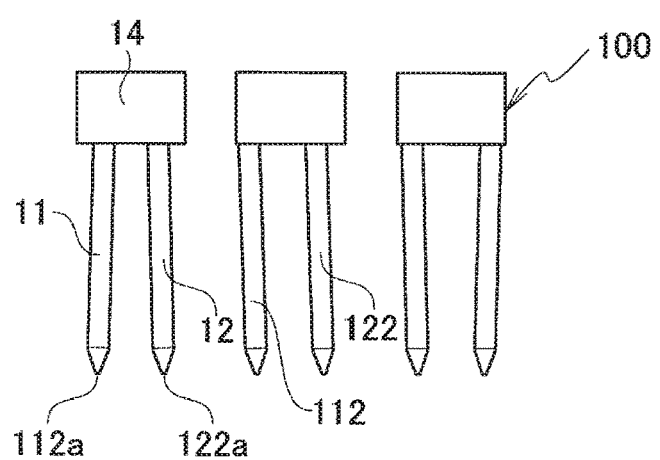
FIG. 6D is a plan view schematically illustrating the example method of manufacturing the sensor body according to the comparison example when the sensor body is formed.

In manufacturing the sensor body 10, a lead frame material 200 in which the connecting portion 23 connects only the tip end portions of the scheduled first-terminal-portion forming portion 212 and the scheduled second-terminal-portion forming portion 222 may be used, as illustrated in FIG. 6A. When the lead frame material 200 illustrated in FIG. 6A is used; however, the scheduled first-terminal-portion forming portion 212 and the scheduled second-terminal-portion forming portion 222 may move relative to each other in the manufacture of the sensor body 10. The relative movement may occur, for example, in such a direction that the scheduled first resin mold portion 211 and the scheduled second resin mold portion 221 come closer to each other or move away from each other (see FIG. 6B). Further, as illustrated in FIG. 6B, there is a possibility that the entire pairs of lead frame portions may move relative to the connecting portion 23 so as to be inclined.

If the scheduled first-terminal-portion forming portion 212 and the scheduled second-terminal-portion forming portion 222 move relative to each other, the thermistor 13 is not able to be placed in the recess or the thermistor 13 cannot be mounted on the lead frame portion.

The above-mentioned relative movement may occur in any manufacturing step of the sensor body 10. Therefore, even if the thermistor 13 is mounted at a desired position in the recess, the scheduled first-terminal-portion forming portion 212 and the scheduled second-terminal-portion forming portion 222 may move relatively.

In this case, the stress applied to the thermistor 13 may damage the thermistor 13 or dismount the thermistor 13. If the sensor body 10 is formed in this state, the temperature of the oil may not be detected or the temperature detection accuracy may be lowered.

In contrast, in the present embodiment, as described above, the scheduled first-terminal-portion forming portion 212 and the scheduled second-terminal-portion forming portion 222 are kept connected by the two connecting portions 23 and 24 until the resin mold portion 14 is completed in the manufacture of the sensor body 10. This prevents the relative movement of the scheduled first-terminal-portion forming portion 212 and the scheduled second-terminal-portion forming portion 222 in the manufacture of the sensor body 10.

With this structure, the sensor body 10 in which the thermistor 13 is mounted at a desired position can be manufactured more reliably. Further, the thermistor 13 is prevented from being damaged during the manufacture of the sensor body 10.

As described above, the lowering of the temperature detection accuracy of the sensor body 10 is prevented.

As described above, the sensor body 10 according to the present embodiment is used in the oil temperature sensor 1 that detects the temperature of oil. The sensor body 10 is manufactured by the following method.

The method of manufacturing the sensor body 10 includes a material preparation step. In the material preparation step, the lead frame material 20 is prepared. The lead frame material 20 includes the scheduled first-terminal-portion forming portion 212 of the first lead frame portion 21 and the scheduled second-terminal-portion forming portion 222 of the second lead frame portion 22 which are connected by the connecting portions 23 and 24.

The method of manufacturing the sensor body 10 includes a thermistor mounting step. In the thermistor mounting step, one end of the thermistor 13 is mounted on the scheduled first resin mold portion 211 of the first lead frame portion 21, and the other end of the thermistor 13 is mounted on the scheduled second resin mold portion 221 of the second lead frame portion 22.

The method of manufacturing the sensor body 10 includes a molding step. In the molding step, with the thermistor 13 mounted on the scheduled first resin mold portion 211 and the scheduled second resin mold portion 221, the scheduled first resin mold portion 211, the scheduled second resin mold portion 221, and the thermistor 13 are molded. In other words, the resin mold portion 14 that covers the scheduled first resin mold portion 211, the scheduled second resin mold portion 221, and the thermistor 13 is formed.

The method of manufacturing the sensor body 10 includes a cutting step. In the cutting step, the connecting portions 23 and 24 are cut, after the resin mold portion 14 is formed, and the scheduled first-terminal-portion forming portion 212 and the scheduled second-terminal-portion forming portion 222 are separated. The sensor body 10 is formed by separating the scheduled first-terminal-portion forming portion 212 and the scheduled second-terminal-portion forming portion 222.

In the sensor body 10 manufactured by such a method, the thermistor 13 is protected by the resin mold portion 14. Therefore, when the oil temperature sensor 1 is manufactured using the sensor body 10, the thermistor 13 is prevented from directly contacting equipment or the like until the manufacture of the oil temperature sensor 1 is completed. As a result, the damage to the thermistor can be prevented more reliably.

As described above, according to the present embodiment, it is possible to provide the method of manufacturing the sensor body 10 capable of preventing lowering of the temperature detection accuracy.

In the molding step described above, the resin mold portion 14 may be formed by transfer molding.

With this structure, the molding pressure applied to the thermistor 13 during formation of the resin mold portion 14 is decreased. This reliably decreases the damage to the thermistor.

The connecting portion may include the first connecting portion 23, which connects the scheduled first-terminal-portion forming portion 212 and the scheduled second-terminal-portion forming portion 222, and the second connecting portion 24, which connects the scheduled first-terminal-portion forming portion 212 and the scheduled second-terminal-portion forming portion 222, at a location different from the location of the first connecting portion 23.

The first connecting portion 23 and the second connecting portion 24 may be cut in the cutting step.

With this structure, the relative movement of the scheduled first-terminal-portion forming portion 212 and the scheduled second-terminal-portion forming portion 222 is prevented in the manufacture of the sensor body 10. Specifically, peel-off of the solder or the damage of the thermistor due to the relative movement between the scheduled first-terminal-portion forming portion 212 and the scheduled second-terminal-portion forming portion 222 is prevented. Thus, the damage of the thermistor is more reliably decreased. Since the relative movement between the scheduled first-terminal-portion forming portion 212 and the scheduled second-terminal-portion forming portion 222 is prevented, an insulating distance between terminals can be ensured.

Further, the first recess 113 may be formed in the scheduled first resin mold portion 211 and opened toward the scheduled second resin mold portion 221. The second recess 123 opening toward the scheduled first resin mold portion 211 may be formed at a location of the scheduled second resin mold portion 221 facing the first recess 113.

Then, in the mounting step, the thermistor 13 may be mounted with its one end placed in the first recess 113 and the other end placed in the second recess 123.

With this structure, the inner surfaces 113*a* and 123*a* of each recess can stop the flow of the solder in soldering of the thermistor 13. This ensures reliable soldering of the thermistor 13 to the first and second lead frames 11 and 12. Further, the inner surfaces 113*a* and 123*a* can prevent positional displacement of the thermistor 13, thus decreasing displacement errors of connection of the thermistor 13.

The first recess 113 may be formed stepwise so that its depth becomes deeper toward the second recess 123. The second recess 123 may be formed stepwise so that its depth becomes deeper toward the first recess 113.

With this structure, a relatively large thermistor 13 can be mounted in the shallow and wide recess, or a relatively small thermistor 13 can be mounted in the deep and narrow recess. This allows various sizes of the thermistors 13 to be mounted under more preferable conditions.

The sensor body 10 used in the oil temperature sensor 1 that detects the temperature of the oil includes the thermistor 13 and the resin mold portion 14 in which the thermistor 13 is buried.

The sensor body 10 includes the first lead frame 11 on which one end of the thermistor 13 is mounted, and the second lead frame 12 arranged apart from the first lead frame 11 and on which the other end of the thermistor 13 is mounted.

The first lead frame 11 includes the first buried portion 111 on which one end of the thermistor 13 is mounted and which is buried in the resin mold portion 14, and the first terminal portion 112 provided continuously from the first buried portion 111 and exposed from the resin mold portion 14.

The second lead frame 12 includes the second buried portion 121 on which the other end of the thermistor 13 is mounted and which is buried in the resin mold portion 14, and the second terminal portion 122 provided continuously from the second buried portion 121 and exposed from the resin mold portion 14.

The first terminal portion 112 and the second terminal portion 122 include cut marks formed during cutting the connected portions.

The first terminal portion 112 and the second terminal portion 122 are formed with the tip-side cut marks 112*a* and 122*a* formed on the tip side and the base-side cut marks 112*b* and 122*b* formed on the base side.

With this structure, the sensor body 10 can be manufactured in a state where the relative movement between the scheduled first-terminal-portion forming portion 212 and the scheduled second-terminal-portion forming portion 222 is prevented. In other words, the sensor body 10 can be manufactured in a situation where peel-off of the solder due to the relative movement between the scheduled first-terminal-portion forming portion 212 and the scheduled second-terminal-portion forming portion 222 or the damage of the thermistor is prevented. According to the present embodiment, it is possible to provide the sensor body 10 capable of preventing the decrease in the temperature detection accuracy.

By using the sensor body 10 manufactured in this manner, various types of oil temperature sensors can be formed.

Hereinafter, examples of oil temperature sensors will be described as second to fifth embodiments.

Second Embodiment

Figure 10:
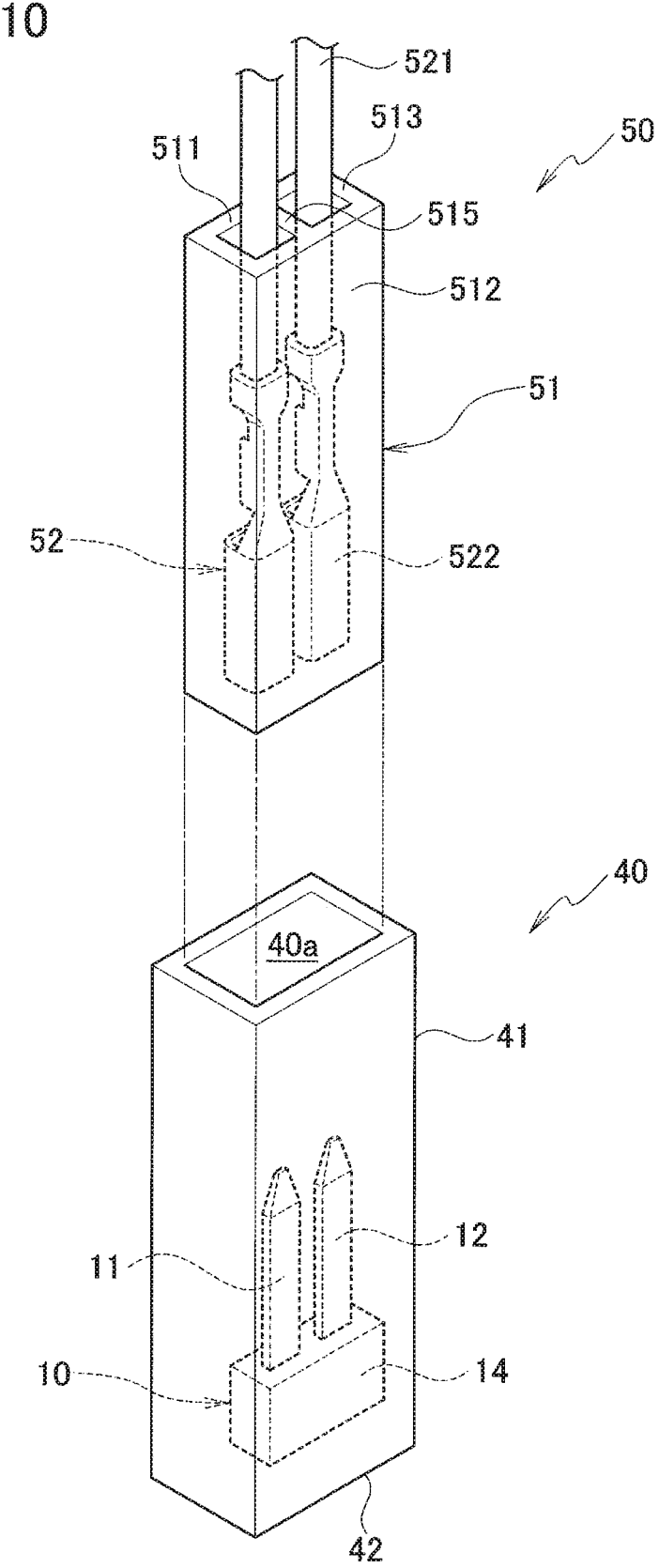
FIG. 10 is a perspective view schematically illustrating an oil temperature sensor and an opponent fitting body according to a second embodiment before the oil temperature sensor and the opponent fitting body are fitted each other.
Figure 11A:
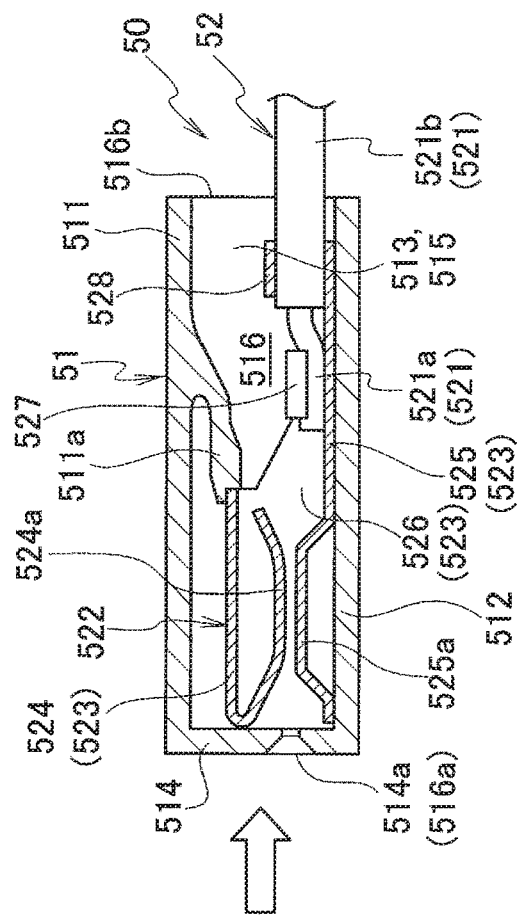
FIG. 11A is a cross-sectional view schematically illustrating the oil temperature sensor and the opponent fitting body according to the second embodiment before the oil temperature sensor and the opponent fitting body are fitted each other.
Figure 11B:
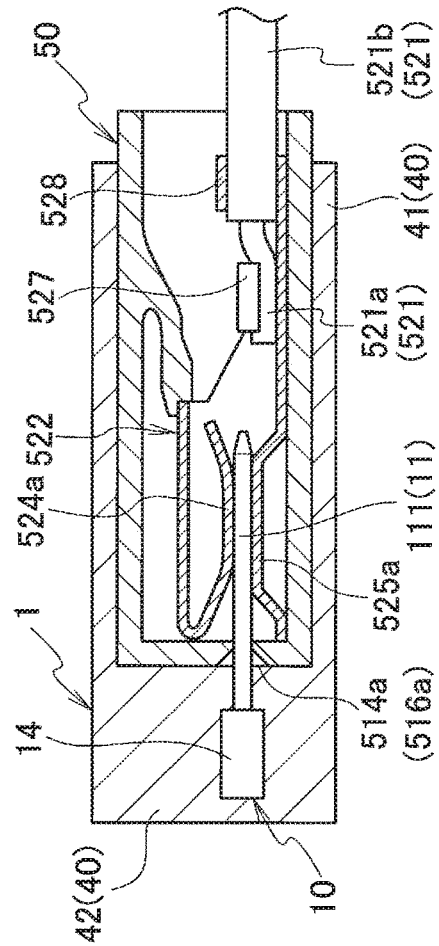
FIG. 11B is a cross-sectional view schematically illustrating the oil temperature sensor and the opponent fitting body according to the second embodiment when the oil temperature sensor and the opponent fitting body are fitted each other.

As illustrated in FIGS. 10, 11A, and 11B, an oil temperature sensor 1 according to the present embodiment includes the sensor body 10 illustrated in the first embodiment and a housing 40 in which a space 40a is formed and which is detachably fitted to an opponent connector (opponent fitting body) 50.

The housing 40 is made of a material such polyphenylene sulfide (PPS), 6,6 nylon, or the like.

In the present embodiment, the resin mold portion 14 of the sensor body 10 is buried in the housing 40 when the housing 40 that is detachably fitted to the opponent connector 50 is formed. In other words, the sensor body 10 is formed by insert molding in the housing 40 in the present embodiment.

At this time, the sensor body 10 is fixed to the housing 40 with portions including the tip ends of the first terminal portion 112 and the second terminal portion 122 being exposed to the space 40a.

Specifically, the housing 40 includes a peripheral wall 41 extending in a front-rear direction, and a rear wall 42 provided continuously from the rear end of the peripheral wall 41 to close a rear opening of the housing 40. Thus, the space 40a that opens forward (on the side facing the opponent connector) is defined by the inner surface of the peripheral wall 41 and the inner surface of the rear wall 42.

Then, the sensor body 10 is insert-molded in the housing 40 such that the entire resin mold portion 14 is buried in the rear wall 42 and that the tip ends of the first terminal portion 112 and the second terminal portion 122 project forward in the front-rear direction.

With this structure, the oil temperature sensor 1 including the sensor body 10 and the housing 40 is formed.

Further, the present embodiment uses the sensor body in which the thermistor 13 mounted on the first and second lead frames 11 and 12 and the portion where the thermistor 13 is mounted are covered with the resin mold portion 14 in advance. With this structure, the thermistor 13 mounted on the first and second lead frames 11 and 12 is protected by the resin mold portion 14.

By insert molding of the housing 40 using the sensor body 10, it is possible to prevent direct application of the molding pressure or the stress of thermal expansion and contraction on the thermistor 13. This prevents damage of the thermistor 13 during insert molding of housing 40 or peeling-off of the soldered portions between the thermistor 13 and the first and second lead frames 11 and 12.

In the present embodiment, the oil temperature sensor 1 is fitted to the opponent connector (opponent fitting body) 50 which is connected to a cable for extracting an output signal from the thermistor 13 to an external device (e.g., ECU). With this structure, the temperature of the oil detected by the thermistor 13 can be output to the outside.

Hereinafter, an example structure of the opponent connector 50 to which the oil temperature sensor 1 is fitted is described.

The opponent connector 50 includes a connector housing 51 as illustrated in FIGS. 10, 11A, and 11B.

The connector housing 51 is formed in a substantially rectangular parallelepiped shape as illustrated in FIGS. 10, 11A, and 11B, and is made of, for example, a synthetic resin. In addition, the connector housing 51 includes a top wall 511, a bottom wall 512, and a pair of side walls 513 and 513, each provided continuously from end portions of the top wall 511 and the bottom wall 512, respectively, in the width direction. Further, the connector housing 51 includes a front wall 514 provided continuously from the front ends of the top wall 511, the bottom wall 512, and the side walls 513 and 513.

In the connector housing 51, a plurality of (two in the present embodiment) terminal storing spaces 516 which are divided by a partition wall 515 and opened at both ends are formed.

A terminal insertion port 516a into which the first terminal portion 112 or the second terminal portion 122 is inserted is formed on the side of each terminal storing space 516 facing the oil temperature sensor 1. In the present embodiment, a through hole 514a formed in the front wall 514 is provided as the terminal insertion port 516a.

A cable outlet 516b is formed on the side of the terminal storing space 516 opposite to the terminal insertion port 516a, and a terminal portion 522 of the cable-attached terminal 52 is inserted into the terminal storing space 516 from the cable outlet 516b. The terminal portion 522 of one cable-attached terminals 52 is stored in one terminal storing space 516.

In the present embodiment, an elastically deformable latching piece 511a is formed on the lower surface (inner surface) of the top wall 511 so as to protrude toward the terminal storing space 516. By latching a top wall 524 of the terminal portion 522 stored in the terminal storing space 516 on the latching piece 511a, the cable-attached terminal 52 stored in the terminal storing space 516 is restricted (positioned).

The cable-attached terminal 52 includes a substantially columnar cable 521 and a terminal portion 522 electrically connected to a conductor 521a of the cable 521.

The cable 521 includes the conductor 521a and an insulating sheath 521b covering the outer periphery of the conductor 521a. The terminal portion 522 is connected to a portion (exposed portion) of the conductor 521a which is not covered by the sheath 521b. For example, the conductor 521a can be made of aluminum or an aluminum-based alloy.

The terminal portion 522 is formed of a conductive metal material such as a copper alloy, and can be formed by bending or pressing a single plate-like member. The terminal portion 522 includes a terminal body 523 having a substantially box shape into which the first terminal portion 112 or the second terminal portion 122 is inserted, and a conductor crimping portion (cable connecting portion) 527 which is crimped to the conductor 521a of the cable 521 and electrically connected to the conductor 521a. Further, the terminal portion 522 includes a cable holding portion (cable connecting portion) 528 which is crimped to the sheath 521b of the cable 521 to hold the cable 521.

The terminal body 523 also includes the top wall 524, a bottom wall 525, and a pair of side walls 526 and 526. An elastic bending portion 524a is formed on the top wall 524, and a projection 525a that protrudes toward the elastic bending portion 524a is formed on the bottom wall 525. The first terminal portion 112 or the second terminal portion 122 is inserted into the gap between the elastic bending portion 524a and the projection 525a. With this structure, the first terminal portion 112 or the second terminal portion 122 is sandwiched between the elastic bending portion 524a and the projection 525a and held in an electrically connected state.

In the present embodiment, the oil temperature sensor 1 and the opponent connector 50 are detachably fitted. In other words, the housing 40 and the connector housing 51 are detachably fitted, and the first terminal portion 112 and the second terminal portion 122 are detachably latched on the terminal portions 522 and 522.

A conventional structure can be adopted as a structure for detachably fitting the oil temperature sensor 1 and the opponent connector 50.

In the present embodiment, the oil temperature sensor is detachably fitted to the opponent connector 50, as described above.

With this structure, the thermistor 13 can be replaced simply by releasing the fitting between the oil temperature sensor 1 from the opponent connector 50 to remove the oil temperature sensor 1 from the opponent connector 50, and replacing the oil temperature sensor 1 with a new oil temperature sensor.

Then, by forming the connector type oil temperature sensor 1 detachably fitted to the opponent connector 50, the oil temperature sensor 1 can be used as being connected to various types of connectors only by changing the shape of the housing 40 of the oil temperature sensor 1 according to the shape of the opponent connector. Since there is no need to change the shape of the opponent connector according to the shape of the oil temperature sensor 1, any existing connector can be used as the opponent connector, thus providing versatility to the oil temperature sensor 1.

Third Embodiment

An oil temperature sensor 1A according to the present embodiment is formed by directly inserting the sensor body 10 illustrated in the first embodiment into a housing 60 of the opponent connector (opponent fitting body) which is connected to a cable for extracting an output signal from the thermistor 13 to an external device.

In other words, the oil temperature sensor 1A includes the sensor body 10 illustrated in the first embodiment and a housing 60 provided with a pair of spaces 616 in which a pair of cable-attached terminals 63 is stored, each cable-attached terminal 63 including the cable 631 and a terminal portion 632 connected to a conductor 631a of the cable 631.

Further, in the present embodiment, the housing 60 includes a terminal-side housing 61 in which the cable-attached terminals 63 are stored, and a sensor-body-side housing 62 in which the sensor body 10 is directly stored.

The terminal-side housing 61 has substantially the same shape as the connector housing 51 of the opponent connector 50 illustrated in the second embodiment.

Figure 12:
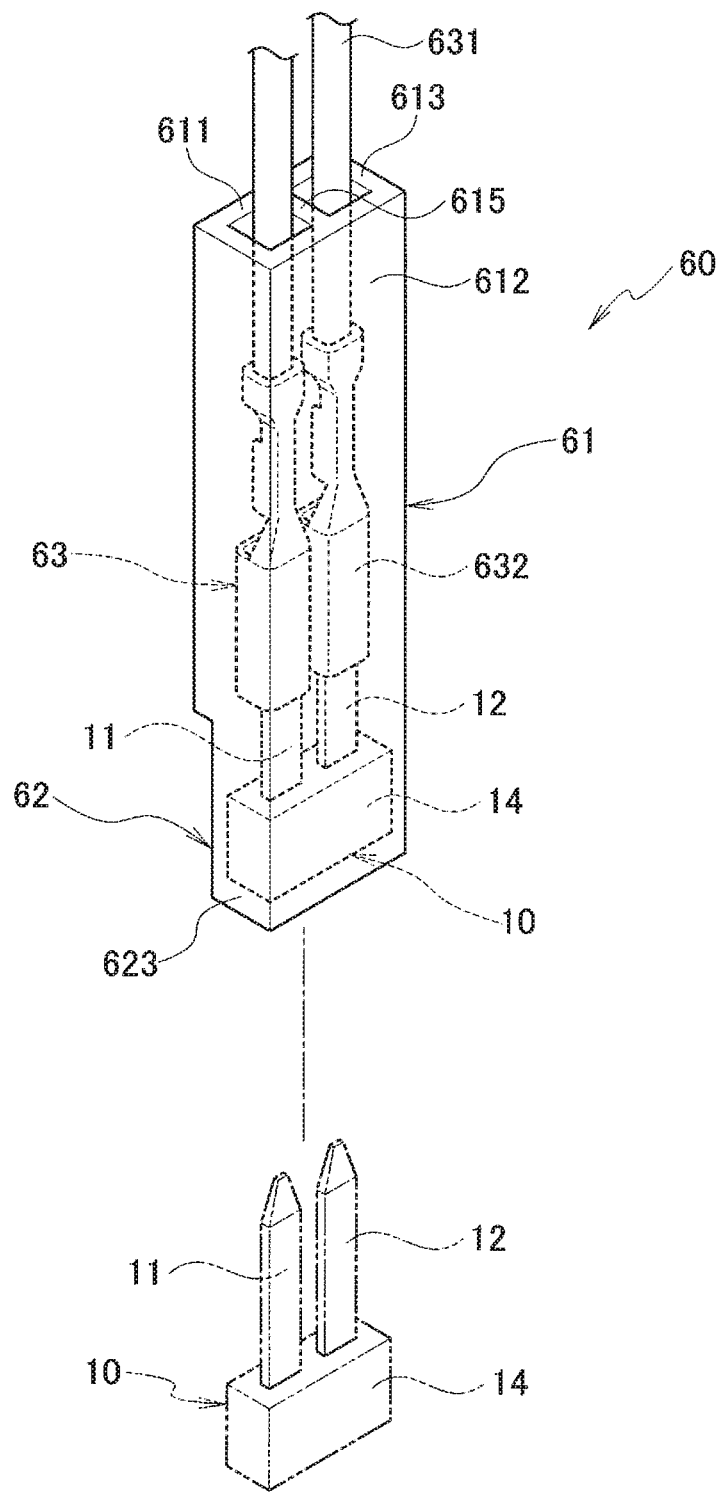
FIG. 12 is a perspective view schematically illustrating an oil temperature sensor according to a third embodiment before a sensor body is stored in a housing.
Figure 13A:
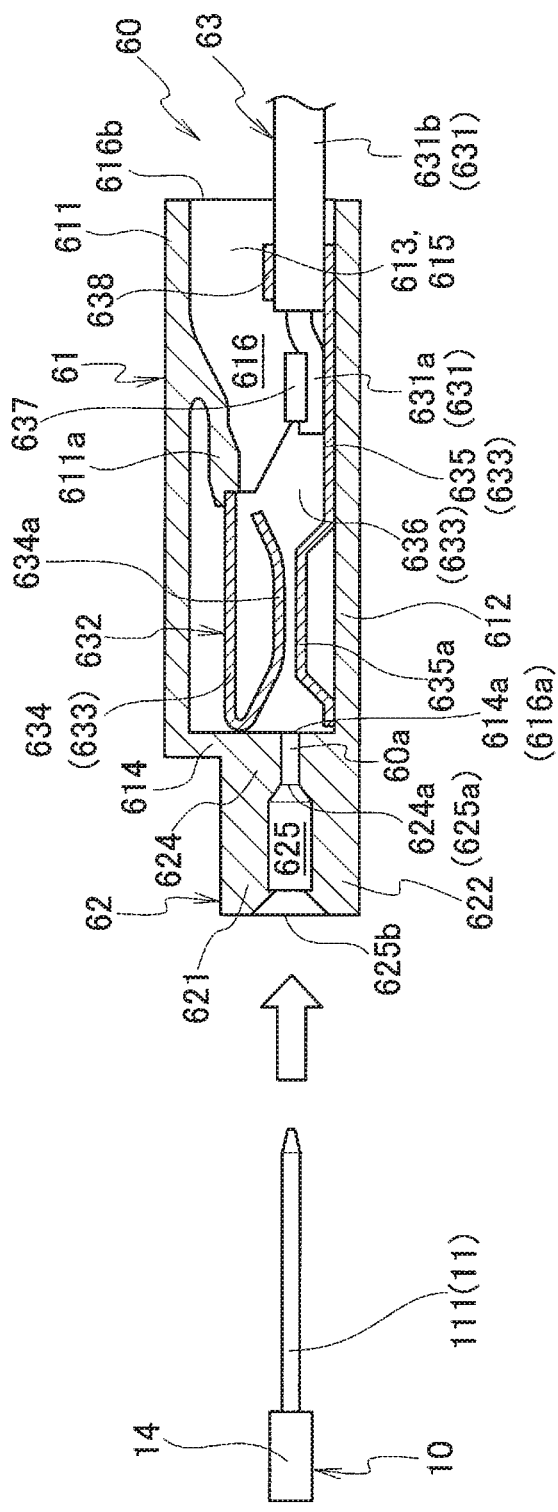
FIG. 13A is a cross-sectional view schematically illustrating the oil temperature sensor according to the third embodiment before the sensor body is stored in the housing.
Figure 13B:
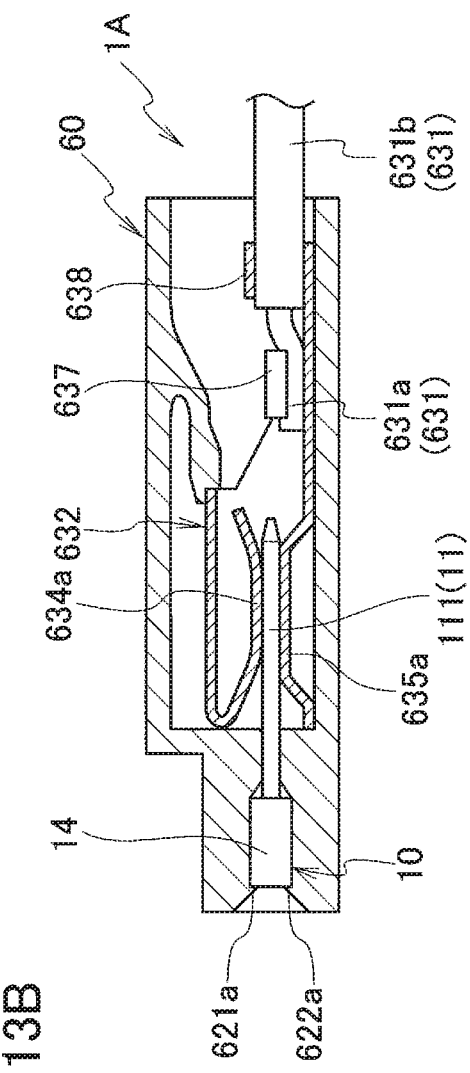
FIG. 13B is a cross-sectional view schematically illustrating the oil temperature sensor according to the third embodiment after the sensor body is stored in the housing.

In other words, the terminal-side housing 61 is formed in a substantially rectangular parallelepiped shape, and is made of, for example, a synthetic resin, as illustrated in FIGS. 12, 13A, and 13B. The terminal-side housing 61 also includes a top wall 611, a bottom wall 612, a pair of side walls 613 and 613, and a front wall 614.

In the terminal-side housing 61, a plurality of (two in the present embodiment) terminal storing spaces 616 which are partitioned by the partition walls 615 and opened at both ends are formed.

A terminal insertion port 616a into which the first terminal portion 112 or the second terminal portion 122 is inserted is formed on the side of each terminal storing space 616 facing the sensor-body-side housing 62. In the present embodiment, the terminal insertion port 616a is provided as a through hole 614a formed in the front wall 614.

Further, a cable outlet 616b is formed on the side opposite to the terminal insertion port 616a of each terminal storing space 616, and the terminal portion 632 of the cable-attached terminal 63 is inserted into the terminal storing space 616 from the cable outlet 616b. The terminal portion 632 of one cable-attached terminal 63 is stored in one terminal storing space 616.

In the present embodiment, an elastically deformable latching piece 611a is formed on the lower surface (inner surface) of the top wall 611 so as to protrude toward the terminal storing space 616. By latching the top wall 634 of the terminal portion 632 stored in the terminal storing space 616 on the latching piece 611a, the cable-attached terminal 63 stored in the terminal storing space 616 is restricted (positioned).

The cable-attached terminal 63 includes the substantially columnar cable 631 and the terminal portion 632 electrically connected to the conductor 631a of the cable 631.

The cable 631 includes a conductor 631a and an insulating sheath 631b covering the outer periphery of the conductor 631a, and the terminal portion 632 is connected to a portion (exposed portion) of the conductor 631a not covered by the sheath 631b. For example, the conductor 631a can be made of aluminum or an aluminum-based alloy.

The terminal portion 632 is formed of a conductive metal material such as a copper alloy, and can be formed by bending or pressing a single plate-like member. The terminal portion 632 includes a terminal body 633 having a substantially box shape into which the first terminal portion 112 or the second terminal portion 122 is inserted, and a conductor crimping portion (cable connecting portion) 637 which is crimped to the conductor 631a of the cable 631 and electrically connected to the conductor 631a. The terminal portion 632 also includes a cable holding portion (cable connecting portion) 638 which is crimped to the sheath 631b of the cable 631 to hold the cable 631.

The terminal body 633 also includes a top wall 634, a bottom wall 635, and a pair of side walls 636 and 636. An elastic bending portion 634a is formed on the top wall 634, and a projection 635a that protrudes toward the elastic bending portion 634a is formed on the bottom wall 635. The first terminal portion 112 or the second terminal portion 122 is inserted into the gap between the elastic bending portion 634a and the projection 635a. With this structure, the first terminal portion 112 or the second terminal portion 122 is sandwiched between the elastic bending portion 634a and the projection 635a and held in an electrically connected state.

On the other hand, the sensor-body-side housing 62 includes a top wall 621, a bottom wall 622, a pair of side walls 623 and 623, and a connecting wall 624. The connecting wall 624 is integrally formed on the front wall 614 of the terminal-side housing 61.

The sensor-body-side housing 62 includes a sensor body storing space 625 in which the sensor body 10 is removably stored. The sensor body storing space 625 is defined by the top wall 621, the bottom wall 622, and the pair of side walls 623 and 623.

Terminal insertion ports 625a and 625a into which the first terminal portion 112 and the second terminal portion 122 are inserted are formed on the side of the sensor body storing space 625 facing the terminal-side housing 61. In the present embodiment, the terminal insertion port 625a is provided as a through hole 624a formed in the connecting wall 624. Further, the through hole 624a is formed to communicate with the through hole 614a, so that a terminal insertion port 60a of the housing 60 is formed by the through hole 624a and the through hole 614a.

Further, a sensor body insertion port 625b is formed on the side opposite to the terminal insertion port 625a in the sensor body storing space 625, and the sensor body 10 is inserted.

In the present embodiment, elastically deformable latching pieces 621a and 622a are formed on the top wall 621 and the bottom wall 622. By latching the resin mold portion 14 of the sensor body 10 stored in the sensor body storing space 625 on the latching pieces 621a and 622a, the sensor body 10 stored in the sensor body storing space 625 is restricted (positioned). In the present embodiment, the resin mold portion 14 of the sensor body 10 is detachably latched on the latching pieces 621a and 622a.

With this structure, when the sensor body 10 is stored in the sensor body storing space 625, the first terminal portion 112 is electrically connected to the terminal portion 632 of one of the cable-attached terminals 63. Then, the second terminal portion 122 is electrically connected to the terminal portion 632 of the other cable-attached terminal 63.

With this structure, the oil temperature sensor 1A according to the present embodiment is formed.

In the present embodiment, the sensor body 10 and the opponent connector are detachably fitted. In other words, the sensor body 10 is removably stored in the sensor body storing space 625, while the first terminal portion 112 and the second terminal portion 122 are detachably latched on the terminal portions 632 and 632.

A conventional structure can be adopted as a structure for detachably fitting the sensor body 10 and the opponent connector.

The present embodiment can also provide the effect similar to the effect of the second embodiment.

The oil temperature sensor 1A according to the present embodiment includes the sensor body 10 that detects the temperature of oil. The housing 60 includes the pair of spaces 616 in which the pair of cable-attached terminals 63 is stored, each cable-attached terminal 63 including the cable 631 and the terminal portion 632 connected to the conductor 631a of the cable 631.

The housing 60 includes the sensor-body-side housing including the sensor body storing space 625 which communicates with the pair of spaces 616 and in which the sensor body 10 is removably stored.

With the sensor body 10 stored in the sensor body storing space 625, the first terminal portion 112 is electrically connected to the terminal portion 632 of one of the cable-attached terminals 63. Further, the second terminal portion 122 is electrically connected to the terminal portion 632 of the other cable-attached terminal 63.

With this structure, the sensor body 10 can be replaced and the thermistor 13 can be replaced more easily.

Fourth Embodiment

An oil temperature sensor 1B according to the present embodiment is formed by attaching a cover 73 in a state in which the first terminal portion 112 and the second terminal portion 122 of the sensor body 10 are directly inserted into a connector unit 70 of the opponent connector (opponent fitting body).

In other words, the oil temperature sensor 1B includes the sensor body 10 described in the above first embodiment and the connector unit 70.

The connector unit 70 includes a pair of cable-attached terminals 72, each including a cable 721 and a terminal portion 722 connected to a conductor 721a of the cable 721, and a housing 71 including a pair of spaces 716 in which the pair of cable-attached terminals 72 is stored.

The connector unit 70 has substantially the same shape as the opponent connector 50 described in the second embodiment.

Figure 14:
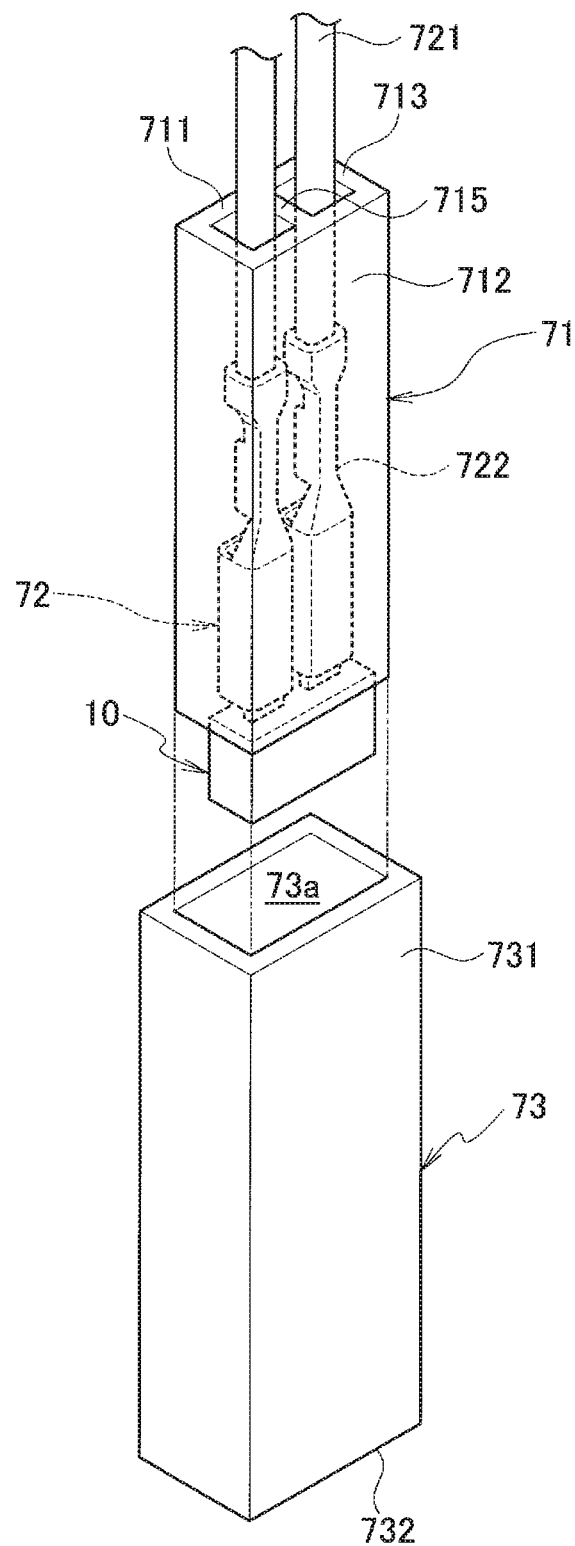
FIG. 14 is a perspective view schematically illustrating an oil temperature sensor according to a fourth embodiment before a connector portion and a cover are fitted each other.

In other words, the connector unit 70 includes a connector housing 71, as illustrated in FIGS. 14, 15A, and 15B.

The connector housing 71 is formed in a substantially rectangular parallelepiped shape as illustrated in FIGS. 14, 15A, and 15B, and is made of, for example, a synthetic resin. Further, the connector housing 71 includes a top wall 711, a bottom wall 712, and a pair of side walls 713 and 713 provided continuously from both ends of the top wall 711 and the bottom wall 712, respectively, in the width direction. The connector housing 71 also includes a front wall 714 provided continuously from the front ends of the top wall 711, the bottom wall 712, and the side walls 713 and 713.

In the connector housing 71, a plurality of (two in the present embodiment) terminal storing spaces 716 which are divided by a partition wall 715 and opened at both ends are formed.

A terminal insertion port 716a into which the first terminal portion 112 or the second terminal portion 122 is inserted is formed on the side of each terminal storing space 716 facing the sensor body 10. In the present embodiment, the terminal insertion port 716a is provided as a through hole 714a formed in the front wall 714.

A cable outlet 716b is formed on the side opposite to the terminal insertion port 716a of each terminal storing space 716, so that the terminal portion 722 of the cable-attached terminal 72 is inserted into the terminal storing space 716 from the cable outlet 716b. The terminal portion 722 of one of the cable-attached terminals 72 is stored in one terminal storing space 716.

In the present embodiment, an elastically deformable latching piece 711a is formed on the lower surface (inner surface) of the top wall 711 so as to protrude toward the terminal storing space 716. By latching a top wall 724 of the terminal portion 722 stored in the terminal storing space 716 on the latching piece 711a, the cable-attached terminal 72 stored in the terminal storing space 716 is restricted (positioned).

The cable-attached terminal 72 includes the substantially columnar cable 721 and the terminal portion 722 electrically connected to the conductor 721a of the cable 721.

The cable 721 includes the conductor 721a and an insulating sheath 721b covering the outer periphery of the conductor 721a, and the terminal portion 722 is connected to a portion (exposed portion) of the conductor 721a which is not covered by the sheath 721b. For example, the conductor 721a can be made of aluminum or an aluminum-based alloy.

The terminal portion 722 is formed of a conductive metal material such as a copper alloy, and can be formed by bending or pressing a single plate-like member. The terminal portion 722 includes a terminal body 723 having a substantially box shape into which the first terminal portion 112 or the second terminal portion 122 is inserted, and a conductor crimping portion (cable connecting portion) 727 which is crimped to the conductor 721a of the cable 721 and electrically connected to the conductor 721a. The terminal portion 722 also includes a cable holding portion (cable connecting portion) 728 which is crimped to the sheath 721b of the cable 721 to hold the cable 721.

The terminal body 723 also includes the top wall 724, a bottom wall 725, and a pair of side walls 726 and 726. The top wall 724 is formed with an elastic bending portion 724a, and a projection 725a that protrudes toward the elastic bending portion 724a is formed on the bottom wall 725. The first terminal portion 112 or the second terminal portion 122 is inserted into the gap between the elastic bending portion 724a and the projection 725a. With this structure, the first terminal portion 112 or the second terminal portion 122 is sandwiched between the elastic bending portion 724a and the projection 725a and held in an electrically connected state.

In the present embodiment, when the sensor body 10 is held in the connector unit 70, the first terminal portion 112 and the second terminal portion 122 are inserted into the connector housing 71, and the resin mold portion 14 is exposed to the outside of the connector housing 71.

For this reason, in the present embodiment, the cover 73 is attached to the connector housing 71 to cover the resin mold portion 14, thus forming the oil temperature sensor 1B. The cover 73 is removably attached to the connector housing 71.

In the present embodiment, the cover 73 includes a peripheral wall 731 extending in the front-rear direction, and a rear wall 732 provided continuously from the rear end of the peripheral wall 731 to close the opening on the rear side. A space 73a that opens forward (toward the side facing the connector unit 70 in which the sensor body 10 is held) is defined by the inner surface of the peripheral wall 731 and the inner surface of the rear wall 732.

Further a storing recess in which the sensor body 10 is stored when the cover 73 is attached to the connector housing 71, is formed in the rear wall 732.

Thus, the oil temperature sensor 1B according to the present embodiment is formed.

In the present embodiment, the sensor body 10 is detachably held by the connector unit 70. Specifically, the first terminal portion 112 and the second terminal portion 122 are detachably latched on the terminal portion 722.

A conventional structure may be adopted as a structure for detachably fitting the sensor body 10 and the connector unit 70.

Thus, the shape of the cover 73 can be appropriately set according to the application.

The present embodiment can also provide the effect similar to the effect of the second embodiment.

The oil temperature sensor 1B according to the present embodiment includes the sensor body 10 that detects the temperature of oil. The oil temperature sensor 1B includes the connector unit 70 including the pair of cable-attached terminals 72 each having the cable 721 and the terminal portion 722 connected to the conductor 721a of the cable 721, and the housing 71 including the pair of spaces 716 in which the pair of cable-attached terminals 72 is stored.

Each space 716 includes the terminal insertion port 716a into which the first terminal portion 112 or the second terminal portion 122 is introduced.

The sensor body 10 is removably held by the connector unit 70. Specifically, the first terminal portion 112 is inserted from the terminal insertion port 716a of the space 716 in which one of the cable-attached terminals 72 is stored, and is detachably latched on the terminal portion 722. Further, the second terminal portion 122 is inserted from the terminal insertion port 716a of the space 716 in which the other cable-attached terminal 72 is stored, and is detachably latched on the terminal portion 722. With this structure, the sensor body 10 is detachably held by the connector unit 70.

With the sensor body 10 held in the connector unit 70, the cover 73 covering the portion exposed to the outside of the connector unit 70 of the sensor body 10 is detachably attached to the housing 71.

With this structure, the sensor body 10 can be replaced and the thermistor 13 can be replaced more easily.

Fifth Embodiment

An oil temperature sensor 1C according to the present embodiment is formed by connecting a joint terminal portion, which is connected to the cable for extracting the output signal from the thermistor 13 to the external device, to the first and second terminal portions 112 and 122 of the sensor body 10 illustrated in the first embodiment.

Figure 16:
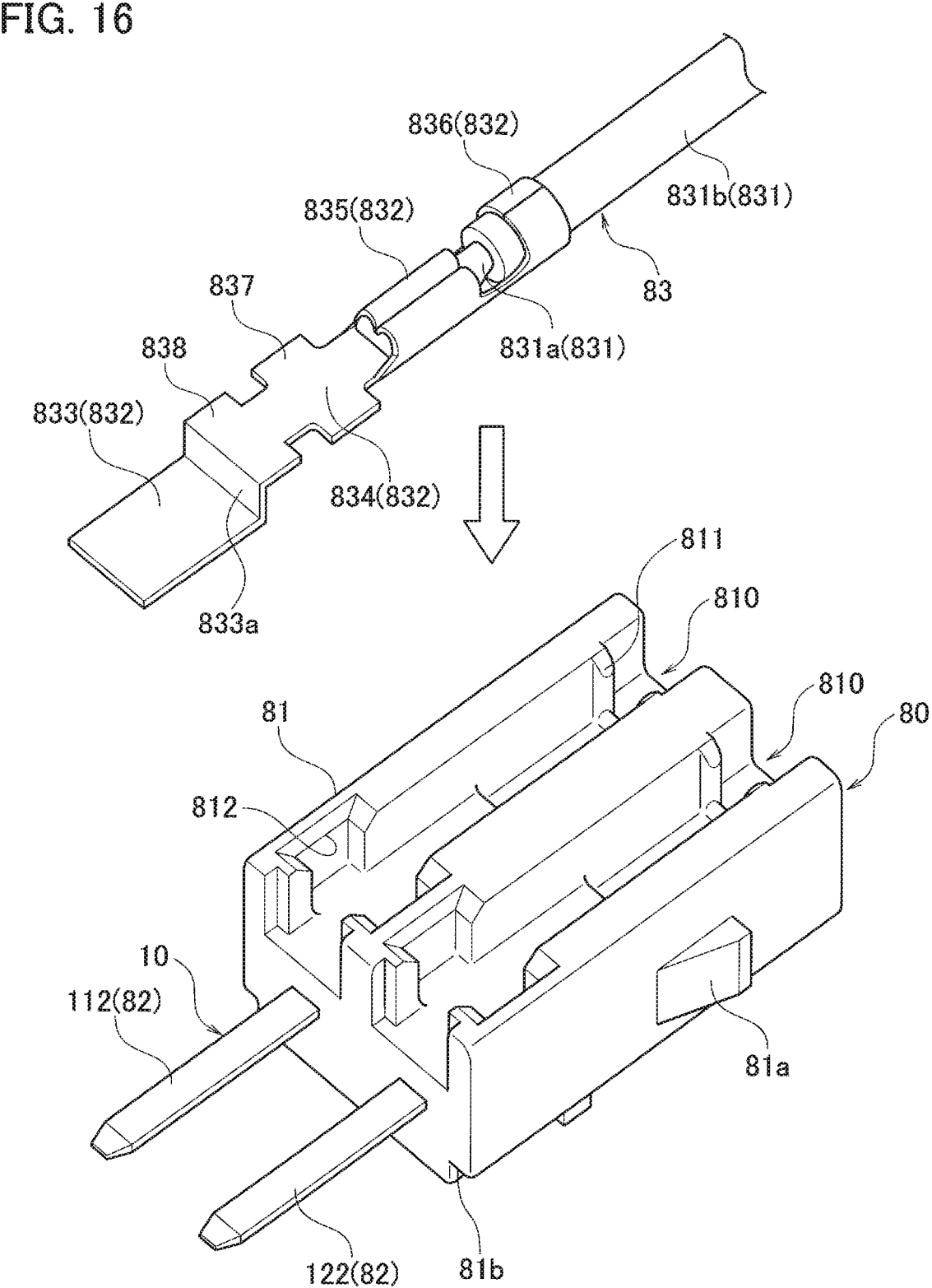
FIG. 16 is a perspective view schematically illustrating a state before the cable-attached terminal is inserted into a housing assembly according to a fifth embodiment.

Specifically, the oil temperature sensor 10 includes a housing assembly 80 in which the sensor body 10 illustrated in the first embodiment is integrated with a housing 81 such that the tip-side terminal portions 112 and 122 are exposed to the outside (see FIG. 16).

In other words, the housing assembly 80 is formed by insert molding of the sensor body 10 in the housing 81.

The resin mold portion 14 of the sensor body 10 is buried in the housing 81. The sensor body 10 is fixed to the housing 81 in a manner that the tip-side portions of the first terminal portion 112 and the second terminal portion 122 are exposed and protrude outward from the housing 81. The portions of the first terminal portion 112 and the second terminal portion 122 protruding outward from the housing 81 are terminal portions 82 of the housing assembly 80.

The terminal portions 82 is provided in a pair.

In the present embodiment, the housing 81 is formed in a substantially rectangular parallelepiped shape, and is made of a material such as polyphenylene sulfide (PPS), or 6,6 nylon.

A pair of grooves 810 is formed on a surface on one side of the housing 81. A cable-attached terminal 83 is partially inserted into each groove 810. In the present embodiment, the pair of grooves 810 is formed on the surface on one side of the terminal portions 82, which are formed when the housing assembly 80 is formed, in the plate thickness direction. In other words, the pair of grooves 810 is formed on the surface of the housing 81 extending in the protruding direction of the terminal portions 82 and in the direction in which the pair of terminal portions 82, 82 is arranged side by side.

In the present embodiment, the pair of grooves 810 is formed linearly so as to extend along substantially the protruding direction of the terminal portions 82. In other words, the housing 81 includes the pair of grooves 810 arranged so as to extend substantially in parallel with each other. The grooves 810 may not be linear, and may partially be curved or bent.

Further, in the present embodiment, when the surface on one side of the housing 81 is viewed in the plate thickness direction (normal to the surface) of the terminal portions 82, one groove 810 is formed to overlap a portion of the terminal portion 112 buried in the housing 81, while the other groove 810 is formed to overlap a portion of the terminal portion 122 buried in the housing 81. In other words, the pair of grooves 810 is arranged apart from the terminal portions 112 and 122 buried in the housing 81 on one side of the terminal portions 112 and 122 in the plate thickness direction.

The pair of grooves 810 is formed as recesses, when viewed in the protruding direction of the terminal portions 82, and is also formed to penetrate in the protruding direction of the terminal portions 82. In other words, the pair of grooves 810 is formed in a manner that each groove 810 is opened at both ends in the extending direction of each groove 810 (in the same direction as the protruding direction of the terminal portions 82) and also in the plate thickness direction of the terminal portions 82 (normal to the surface on one side, i.e., in a direction crossing the extending direction of each groove 810).

With this structure, the cable-attached terminal 83 arranged linearly along the groove 810 can be inserted partially into the groove 810 by simply moving the cable-attached terminal 83 in the plate thickness direction of the terminal portion 82 (in the direction crossing the extending direction of the cable 831).

Each cable-attached terminal 83 inserted into the groove 810 includes a substantially cylindrical cable 831 and a joint terminal portion 832 which is electrically connected to a conductor 831a of the cable 831.

The cable 831 includes the conductor 831a and an insulating sheath 831b covering the outer periphery of the conductor 831a. The joint terminal portion 832 is connected to a portion (exposed portion) of the conductor 831a not covered by the sheath 831b. The conductor 831a can be made of, for example, aluminum or an aluminum-based alloy.

The joint terminal portion 832 is made of a conductive metal material such as a copper alloy, and can be formed by bending or pressing a single plate-like member.

The joint terminal portion 832 includes a connecting terminal portion 833, which is exposed to the outside of the housing 81 and electrically connected to the terminal portion 82, and an portion to be inserted 834 which is provided continuously from the connecting terminal portion 833 and inserted into the groove 810. The joint terminal portion 832 also includes a conductor crimping portion (cable connecting portion) 835 which is provided continuously from the portion to be inserted 834 and crimped and electrically connected to the conductor 831a of the cable 831. Further, the joint terminal portion 832 includes a cable holding portion (cable connecting portion) 836 which is provided continuously from the conductor crimping portion 835 and crimped to the sheath 831b of the cable 831 to hold the cable 831.

The joint terminal portion 832 except for the connecting terminal portion 833 (the portion to be inserted 834 and the cable connecting portions 835 and 836) is inserted into the groove 810. At this time, the sheath 831b located outside the cable holding portion 836 of the cable 831 is also inserted partially into the groove 810. Thus, the entire cable connecting portions 835 and 836 is inserted into the groove 810, so that the connecting portion between the joint terminal portion 832 and the cable 831 is protected by the groove 810.

In the present embodiment, of the terminal portions 82 and the connecting terminal portions 833, the connecting terminal portions 833 which are at least one terminal portions are bent at portions away from the housing 81 toward the terminal portions 82 which are the other terminal portions. In other words, each connecting terminal portion 833 includes a bent portion 833a between the base side (the housing 81 side) and the tip end. Alternatively, the terminal portion 82 may be bent, or both the terminal portion 82 and the connecting terminal portion 833 may be bent.

Further, the terminal portion 82 and the connecting terminal portion 833 are arranged to be in contact with each other when the cable-attached terminal 83 is inserted into the groove 810.

With the terminal portion 82 and the connecting terminal portion 833 being in contact with each other, the terminal portion 82 and the connecting terminal portion 833 are mechanically connected. Specifically, the terminal portion 82 and the connecting terminal portion 833 are connected by welding, so that the terminal portion 82 and the connecting terminal portion 833 are mechanically connected. Alternatively, the terminal portion 82 and the connecting terminal portion 833 may be mechanically connected by a method other than welding, such as soldering.

With this structure, the cable 831 can be connected to the terminal portion 82 more efficiently. Since the connecting terminal portions 833 and the terminal portions are connected (welded) at the position away from the housing 81, the connected portions (welded portions) are prevented from being affected by the thermal expansion and contraction of the housing 81.

In the present embodiment, a press-fit rib 811 that protrudes inward in the width direction of the groove 810 is formed at a portion of the groove 810 where the sheath 831b is inserted. When the cable-attached terminal 83 is inserted into the groove 810, the sheath 831b is press fitted by the press-fit rib 811. With this structure, the cable-attached terminal 83 can be held in the groove 810 more reliably.

By the press-fit of the sheath 831b into the groove 810, the press-fit portion between the sheath 831b and the press-fit rib 811 receives a pulling force applied to the cable 831 in the extending direction. This prevents the force applied to the cable 831 from being transmitted to the connecting portion (welded portion) between the joint terminal portion 832 and the terminal portion 82. In particular, in the present embodiment, the sheath 831b positioned outside the cable holding portion 836 is press fitted into the groove 810, so that the pulling force in the extending direction applied to the cable 831 is prevented from being transmitted to the cable holding portion 836 or the conductor crimping portion 835.

Thus, by the press-fit of the sheath 831b into the groove 810, it is possible to maintain the connection state between the joint terminal portion 832 and the terminal portion 82 and between the joint terminal portion 832 and the cable 831 more preferably.

Each groove 810 also includes a positioning recess 812 which is recessed in a direction crossing the extending direction of the groove 810. On the other hand, the portion to be inserted 834 includes a positioning projection 837 which is arranged in the positioning recess 812 when the cable-attached terminal 83 is inserted into the groove 810. With this structure, the positional displacement of the cable-attached terminal 83 inserted into the groove 810 is prevented.

With the positioning projection 837 placed in the positioning recess 812, the positioning projection 837 hits the housing 81 in the positioning recess 812 when the cable 831 receives the pulling force in the extending direction. Accordingly, the positioning projection 837 also receives the pulling force in the extending direction applied to the cable 831.

A position restricting portion 838 that hits the housing 81 when the cable-attached terminal 83 is inserted into the groove 810 is formed on the housing 81 side of the connecting terminal portion 833 and restricts the movement of the cable-attached terminal 83 in the extending direction of the groove 810.

As described above, the present embodiment restricts the movement of the cable-attached terminal 83 in the extending direction of the groove 810 also by the connecting terminal portion 833 that protrudes to the outside of the housing 81. For this reason, the positional displacement of the cable-attached terminal 83 can be prevented more reliably.

Figure 17:
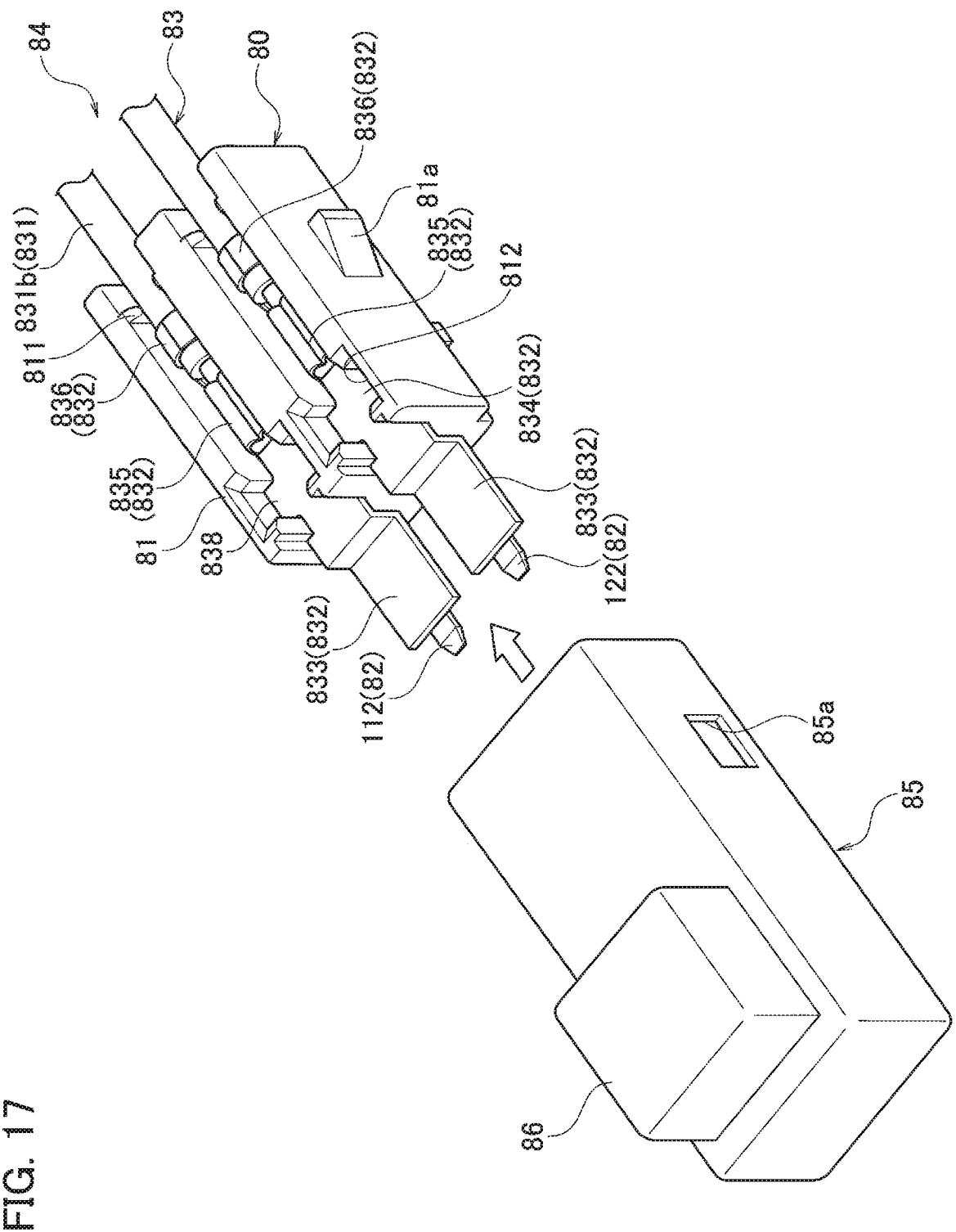
FIG. 17 is a perspective view schematically illustrating a state before the cover is attached to an oil temperature sensor sub-assembly according to the fifth embodiment.
Figure 18:
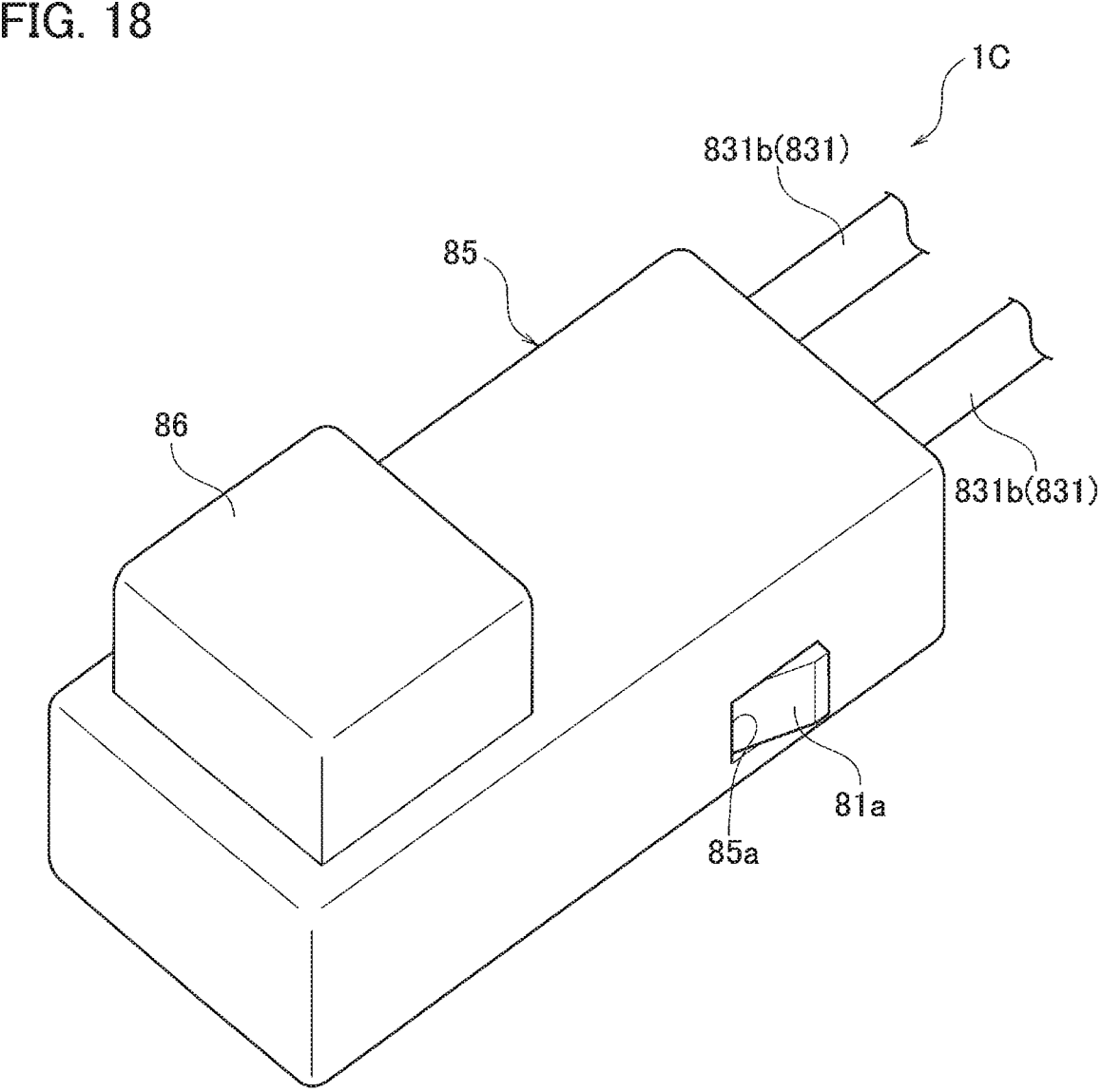
FIG. 18 is a perspective view schematically illustrating an oil temperature sensor according to the fifth embodiment.

A sensor sub-assembly 84 is formed by electrically connecting the terminal portion 82 and the connecting terminal portion 833, while inserting and holding the cable-attached terminal 83 in the groove 810 (see FIG. 17).

A cover 85 is attached to the sensor sub-assembly 84 to cover the connecting terminal portions 833 and the terminal portions 82 including the connected portions (welded portions) to form the oil temperature sensor 1C.

The cover 85 is detachably attached to the housing 81. In the present embodiment, the cover 85 is detachably attached to the housing 81 by detachably engaging an engagement projection 81a formed on the housing 81 with an engagement hole 85a formed in the cover 85.

In the present embodiment, the cover 85 is attached to and detached from the housing 81 by sliding the cover 85 relative to the housing 81. The housing 81 includes guide grooves 81b for guiding guide projections (not illustrated) formed on the cover 85.

The cover 85 includes an attaching portion 86. By attaching the attaching portion 86 to a member to be attached, such as a valve body, the oil temperature sensor 1C is detachably attached to the member to be attached.

The present embodiment can also provide the effect similar to the effect of the second embodiment.

Although preferred embodiments of the invention have been described, the present invention is not limited to the above embodiments, and various modifications are possible.

What is claimed is:

1. A method of manufacturing a sensor body configured to be used in an oil temperature sensor that detects a temperature of oil, comprising:
   preparing a lead frame material in which a first-terminal-portion forming portion of a first lead frame portion and a second-terminal-portion forming portion of a second lead frame portion are connected by a connecting portion;
   mounting one end of a thermistor on a first resin mold portion of the first lead frame portion, while mounting the other end of the thermistor on a second resin mold portion of the second lead frame portion;
   molding the first resin mold portion, the second resin mold portion, and the thermistor to form a resin mold portion, when the thermistor is mounted on the first resin mold portion and the second resin mold portion; and
   cutting the connecting portion after the resin mold portion is formed, and separating the first-terminal-portion forming portion and the second-terminal-portion forming portion.

2. The method of manufacturing the sensor body according to claim 1, wherein the molding includes forming the resin mold portion by transfer molding.

3. The method of manufacturing the sensor body according to claim 1, wherein
   the connecting portion includes a first connecting portion connecting the first-terminal-portion forming portion and the second-terminal-portion forming portion and a second connecting portion connecting the first-terminal-portion forming portion and the second-terminal-portion forming portion at a location different from the location of the first connecting portion, and
   the cutting includes cutting the first connecting portion and the second connecting portion.

4. The method of manufacturing the sensor body according to claim 1, wherein
   a first recess opening toward the second resin mold portion is formed in the first resin mold portion,
   a second recess opening toward the first resin mold portion is formed at a location of the second resin mold portion facing the first recess, and
   the mounting of the thermistor includes mounting the thermistor in a manner such that the one end of the thermistor is placed in the first recess and the other end of the thermistor is placed in the second recess.

5. The method of manufacturing the sensor body according to claim 4, wherein the first recess is formed stepwise and becomes deeper toward the second recess, and the second recess is formed stepwise and becomes deeper toward the first recess.

* * * * *